(12) United States Patent
Kephart et al.

(10) Patent No.: US 10,509,870 B2
(45) Date of Patent: *Dec. 17, 2019

(54) METHOD AND APPARATUS FOR DEPLOYING INDUSTRIAL PLANT SIMULATORS USING CLOUD COMPUTING TECHNOLOGIES

(71) Applicant: EMERSON PROCESS MANAGEMENT POWER & WATER SOLUTIONS, INC., Pittsburgh, PA (US)

(72) Inventors: Richard W. Kephart, Kittanning, PA (US); Herman Sanchez, Kittanning, PA (US); Eugene Abruzere, Lower Burrell, PA (US)

(73) Assignee: EMERSON PROCESS MANAGEMENT POWER & WATER SOLUTIONS, INC., Pittsburgh, PA (US)

( * ) Notice: Subject to any disclaimer, the term of this patent is extended or adjusted under 35 U.S.C. 154(b) by 414 days.

This patent is subject to a terminal disclaimer.

(21) Appl. No.: 15/379,736

(22) Filed: Dec. 15, 2016

(65) Prior Publication Data

US 2017/0098022 A1   Apr. 6, 2017

Related U.S. Application Data

(62) Division of application No. 13/357,341, filed on Jan. 24, 2012, now Pat. No. 9,529,348.

(51) Int. Cl.
*G06F 17/50* (2006.01)
*G05B 19/418* (2006.01)
*G05B 17/02* (2006.01)

(52) U.S. Cl.
CPC ........ *G06F 17/5009* (2013.01); *G05B 17/02* (2013.01); *G05B 19/41885* (2013.01);
(Continued)

(58) Field of Classification Search
CPC ............. G06F 17/5099; G06F 2217/04; G05B 19/41885; G05B 2219/2609;
(Continued)

(56) References Cited

U.S. PATENT DOCUMENTS 4,446,341 A   5/1984   Rubin
4,527,271 A   7/1985   Hallee et al.
(Continued)

FOREIGN PATENT DOCUMENTS

CN   101114160 A   1/2008
CN   102063756 A   5/2011
(Continued)

OTHER PUBLICATIONS

Examination Report for Application No. GB1301020.2, dated Mar. 8, 2018.
(Continued)

*Primary Examiner* — Brian S Cook
(74) *Attorney, Agent, or Firm* — Marshall, Gerstein & Borun LLP

(57) ABSTRACT

A system and method for operating a remote plant simulation system is disclosed. The system and method uses a light application at the plant to collect relevant data and communicate it to a remote plant simulation. The remote plant simulation uses the relevant data, including data from the actual process, to create a process simulation and communicate the display data to the light application operating at the plant where it is displayed to a user. The remote system offers the advantage of offering decreased cost and improved simulation as the equipment cost, operator cost and set up (Continued)

cost is shared by a plurality of users. Further, the data may be stored remotely and subject to data analytics which may identify additional areas for efficiency in the plant.

23 Claims, 7 Drawing Sheets

(52) U.S. Cl.
CPC ............... G05B 2219/2609 (2013.01); G05B 2219/31124 (2013.01); G05B 2219/32345 (2013.01); G06F 2217/04 (2013.01); Y02P 90/18 (2015.11); Y02P 90/26 (2015.11)

(58) Field of Classification Search
CPC .......... G05B 2219/31124; G05B 2219/32245; Y02P 90/18; Y02P 90/26
USPC ........................................................ 703/18
See application file for complete search history.

(56) References Cited

U.S. PATENT DOCUMENTS

| | | |
|---|---|---|
| 4,607,325 A | 8/1986 | Horn |
| 4,630,189 A | 12/1986 | Ohmori et al. |
| 4,657,179 A | 4/1987 | Aggers et al. |
| 4,734,873 A | 3/1988 | Malloy et al. |
| 4,763,243 A | 8/1988 | Barlow et al. |
| 4,764,862 A | 8/1988 | Barlow et al. |
| 4,885,694 A | 12/1989 | Pray et al. |
| 4,907,167 A | 3/1990 | Skeirik |
| 4,910,691 A | 3/1990 | Skeirik |
| 4,944,035 A | 7/1990 | Roger et al. |
| 4,956,793 A | 9/1990 | Bonne et al. |
| 4,965,742 A | 10/1990 | Skeirik |
| 5,006,992 A | 4/1991 | Skeirik |
| 5,008,810 A | 4/1991 | Kessel et al. |
| 5,015,934 A | 5/1991 | Holley et al. |
| 5,018,215 A | 5/1991 | Nasr et al. |
| 5,043,863 A | 8/1991 | Bristol et al. |
| 5,050,095 A | 9/1991 | Samad |
| 5,070,458 A | 12/1991 | Gilmore et al. |
| 5,121,467 A | 6/1992 | Skeirik |
| 5,134,574 A | 7/1992 | Beaverstock et al. |
| 5,140,530 A | 8/1992 | Guha et al. |
| 5,142,612 A | 8/1992 | Skeirik |
| 5,161,013 A | 11/1992 | Rylander et al. |
| 5,167,009 A | 11/1992 | Skeirik |
| 5,173,899 A | 12/1992 | Ballance |
| 5,187,674 A | 2/1993 | Boone |
| 5,193,143 A | 3/1993 | Kaemmerer et al. |
| 5,197,114 A | 3/1993 | Skeirik |
| 5,212,765 A | 5/1993 | Skeirik |
| 5,224,203 A | 6/1993 | Skeirik |
| 5,282,261 A | 1/1994 | Skeirik |
| 5,291,190 A | 3/1994 | Scarola et al. |
| 5,301,101 A | 4/1994 | MacArthur et al. |
| 5,301,122 A | 4/1994 | Halpern |
| 5,311,447 A | 5/1994 | Bonne |
| 5,329,443 A | 7/1994 | Bonaquist et al. |
| 5,333,298 A | 7/1994 | Bland et al. |
| 5,351,184 A | 9/1994 | Lu et al. |
| 5,353,207 A | 10/1994 | Keeler et al. |
| 5,369,599 A | 11/1994 | Sadjadi et al. |
| 5,373,452 A | 12/1994 | Guha |
| 5,384,698 A | 1/1995 | Jelinek |
| 5,390,326 A | 2/1995 | Shah |
| 5,396,415 A | 3/1995 | Konar et al. |
| 5,398,303 A | 3/1995 | Tanaka |
| 5,402,367 A | 3/1995 | Sullivan et al. |
| 5,408,406 A | 4/1995 | Mathur et al. |
| 5,412,780 A | 5/1995 | Rushton |
| 5,442,544 A | 8/1995 | Jelinek |
| 5,486,920 A | 1/1996 | Killpatrick et al. |
| 5,486,995 A | 1/1996 | Krist et al. |
| 5,486,996 A | 1/1996 | Samad et al. |
| 5,488,697 A | 1/1996 | Kaemmerer et al. |
| 5,537,310 A | 7/1996 | Tanake et al. |
| 5,541,833 A | 7/1996 | Bristol et al. |
| 5,546,301 A | 8/1996 | Agrawal et al. |
| 5,559,690 A | 9/1996 | Keeler et al. |
| 5,561,599 A | 10/1996 | Lu |
| 5,566,065 A | 10/1996 | Hansen et al. |
| 5,570,282 A | 10/1996 | Hansen et al. |
| 5,572,420 A | 11/1996 | Lu |
| 5,574,638 A | 11/1996 | Lu |
| 5,596,704 A | 1/1997 | Geddes et al. |
| 5,640,491 A | 6/1997 | Bhat et al. |
| 5,640,493 A | 6/1997 | Skeirik |
| 5,666,297 A | 9/1997 | Britt et al. |
| 5,680,409 A | 10/1997 | Qin et al. |
| 5,687,090 A | 11/1997 | Chen et al. |
| 5,692,158 A | 11/1997 | Degeneff et al. |
| 5,704,011 A | 12/1997 | Hansen et al. |
| 5,715,158 A | 2/1998 | Chen |
| 5,729,661 A | 3/1998 | Keeler et al. |
| 5,740,324 A | 4/1998 | Mathur et al. |
| 5,742,513 A | 4/1998 | Bouhenguel et al. |
| 5,761,518 A | 6/1998 | Boehling et al. |
| 5,764,891 A | 6/1998 | Warrior |
| 5,768,119 A | 6/1998 | Havekost et al. |
| 5,777,872 A | 7/1998 | He |
| 5,781,432 A | 7/1998 | Keeler et al. |
| 5,790,898 A | 8/1998 | Kishima et al. |
| 5,796,606 A | 8/1998 | Spring et al. |
| 5,796,609 A | 8/1998 | Tao et al. |
| 5,798,939 A | 8/1998 | Ochoa et al. |
| 5,805,442 A | 9/1998 | Crater et al. |
| 5,809,490 A | 9/1998 | Guiver et al. |
| 5,819,050 A | 10/1998 | Boehling et al. |
| 5,819,232 A | 10/1998 | Shipman |
| 5,825,645 A | 10/1998 | Konar et al. |
| 5,826,249 A | 10/1998 | Skeirik |
| 5,828,567 A | 10/1998 | Eryurek et al. |
| 5,842,189 A | 11/1998 | Keeler et al. |
| 5,847,952 A | 12/1998 | Samad |
| 5,859,773 A | 1/1999 | Keeler et al. |
| 5,859,964 A | 1/1999 | Wang et al. |
| 5,877,954 A | 3/1999 | Klimasauskas et al. |
| 5,892,679 A | 4/1999 | He |
| 5,892,939 A | 4/1999 | Call et al. |
| 5,898,869 A | 4/1999 | Anderson |
| 5,901,058 A | 5/1999 | Steinman et al. |
| 5,905,989 A | 5/1999 | Biggs |
| 5,907,701 A | 5/1999 | Hanson |
| 5,909,370 A | 6/1999 | Lynch |
| 5,909,541 A | 6/1999 | Sampson et al. |
| 5,909,586 A | 6/1999 | Anderson |
| 5,917,840 A | 6/1999 | Cheney et al. |
| 5,918,233 A | 6/1999 | La Chance et al. |
| 5,924,086 A | 7/1999 | Mathur et al. |
| 5,940,290 A | 8/1999 | Dixon |
| 5,948,101 A | 9/1999 | David et al. |
| 5,949,417 A | 9/1999 | Calder |
| 5,960,214 A | 9/1999 | Sharpe, Jr. et al. |
| 5,960,441 A | 9/1999 | Bland et al. |
| 5,975,737 A | 11/1999 | Crater et al. |
| 5,984,502 A | 11/1999 | Calder |
| 5,988,847 A | 11/1999 | McLaughlin et al. |
| 6,008,985 A | 12/1999 | Lake et al. |
| 6,014,612 A | 1/2000 | Larson et al. |
| 6,017,143 A | 1/2000 | Eryurek et al. |
| 6,033,257 A | 3/2000 | Lake et al. |
| 6,038,540 A | 3/2000 | Krist et al. |
| 6,041,263 A | 3/2000 | Boston et al. |
| 6,047,221 A | 4/2000 | Piche et al. |
| 6,055,483 A | 4/2000 | Lu |
| 6,061,603 A | 5/2000 | Papadopoulos et al. |
| 6,067,505 A | 5/2000 | Bonoyer et al. |
| 6,076,124 A | 6/2000 | Korowitz et al. |
| 6,078,843 A | 6/2000 | Shavit |
| 6,093,211 A | 7/2000 | Hamielec et al. |
| 6,106,785 A | 8/2000 | Haviena et al. |
| 6,108,616 A | 8/2000 | Borchers et al. |

(56) References Cited

U.S. PATENT DOCUMENTS

| | | | |
|---|---|---|---|
| 6,110,214 A | 8/2000 | Kiimasaukas | |
| 6,122,555 A | 9/2000 | Lu | |
| 6,128,279 A | 10/2000 | O'Neil et al. | |
| 6,144,952 A | 11/2000 | Keeler et al. | |
| 6,157,916 A | 12/2000 | Hoffman | |
| 6,169,980 B1 | 1/2001 | Keeler et al. | |
| 6,175,934 B1 | 1/2001 | Hershey et al. | |
| 6,188,990 B1 | 2/2001 | Brook et al. | |
| 6,192,321 B1 | 2/2001 | Grumstrup et al. | |
| 6,198,479 B1 | 3/2001 | Humpleman et al. | |
| 6,208,953 B1 | 3/2001 | Milek et al. | |
| 6,272,469 B1 | 8/2001 | Koritzinsky et al. | |
| 6,298,377 B1 | 10/2001 | Hartikainen et al. | |
| 6,298,454 B1 | 10/2001 | Schleiss et al. | |
| 6,317,701 B1 | 11/2001 | Pyotsia et al. | |
| 6,332,110 B1 | 12/2001 | Wolfe | |
| 6,385,558 B1 | 5/2002 | Schlemm | |
| 6,385,562 B1 | 5/2002 | Roth et al. | |
| 6,397,114 B1 | 5/2002 | Eryurek | |
| 6,421,571 B1 | 7/2002 | Spriggs et al. | |
| 6,434,572 B2 | 8/2002 | Derzay et al. | |
| 6,442,515 B1 | 8/2002 | Varma et al. | |
| 6,445,962 B1 | 9/2002 | Blevins et al. | |
| 6,445,963 B1 | 9/2002 | Blevins et al. | |
| 6,496,751 B1 | 12/2002 | Salvo et al. | |
| 6,529,780 B1 | 3/2003 | Soergel et al. | |
| 6,556,956 B1 | 4/2003 | Hunt | |
| 6,633,782 B1 | 10/2003 | Schleiss et al. | |
| 6,701,223 B1 | 3/2004 | Rachford, Jr. et al. | |
| 6,721,609 B1 | 4/2004 | Wojsznis et al. | |
| 6,774,786 B1 | 8/2004 | Havekost et al. | |
| 6,795,798 B2 | 9/2004 | Eryurek et al. | |
| 7,151,966 B1* | 12/2006 | Baier | G05B 19/056 700/19 |
| 7,269,569 B2 | 9/2007 | Spira et al. | |
| 7,582,189 B2 | 9/2009 | Pihola et al. | |
| 2002/0006790 A1 | 1/2002 | Blumenstock et al. | |
| 2002/0116157 A1 | 8/2002 | Markle et al. | |
| 2002/0120352 A1 | 8/2002 | Stothert et al. | |
| 2002/0123864 A1 | 9/2002 | Eryurek et al. | |
| 2002/0147511 A1 | 10/2002 | Eryurek et al. | |
| 2002/0163427 A1 | 11/2002 | Eryurek et al. | |
| 2003/0041135 A1 | 2/2003 | Keyes et al. | |
| 2003/0154056 A1 | 8/2003 | Ito et al. | |
| 2004/0102928 A1 | 5/2004 | Cuddihy et al. | |
| 2004/0158474 A1 | 8/2004 | Karschnia et al. | |
| 2004/0186603 A1 | 9/2004 | Sanford et al. | |
| 2005/0007249 A1 | 1/2005 | Eryurek et al. | |
| 2007/0285079 A1 | 12/2007 | Nasle | |
| 2008/0027704 A1* | 1/2008 | Kephart | G05B 19/41885 703/22 |
| 2008/0109090 A1 | 5/2008 | Esmaili et al. | |
| 2009/0198350 A1 | 8/2009 | Thiele | |
| 2009/0204234 A1 | 8/2009 | Sustaeta et al. | |
| 2009/0319058 A1 | 12/2009 | Rovaglio et al. | |
| 2010/0023151 A1 | 1/2010 | Shieh et al. | |
| 2010/0169072 A1 | 7/2010 | Zaki et al. | |
| 2010/0256795 A1* | 10/2010 | McLaughlin | G05B 19/4183 700/110 |
| 2010/0325191 A1 | 12/2010 | Jung et al. | |
| 2011/0145153 A1 | 6/2011 | Dawson et al. | |
| 2011/0282500 A1 | 11/2011 | Long et al. | |

FOREIGN PATENT DOCUMENTS

| | | |
|---|---|---|
| CN | 102176723 A | 9/2011 |
| CN | 102255933 A | 11/2011 |
| EP | 0 822 473 A2 | 2/1998 |
| EP | 0 825 506 | 2/1998 |
| EP | 0 895 197 A1 | 2/1999 |
| EP | 0 964 325 A1 | 12/1999 |
| EP | 0 965 897 A1 | 12/1999 |
| EP | 1 109 101 A2 | 6/2001 |
| EP | 1 197 861 A2 | 4/2002 |
| EP | 1 262 848 A2 | 12/2002 |
| EP | 2 293 164 A1 | 3/2011 |
| EP | 2 508 954 A1 | 10/2012 |
| JP | 11-119815 A | 4/1999 |
| JP | 2001-216423 | 8/2001 |
| JP | 2002-073154 | 3/2002 |
| JP | 2002-287816 | 10/2002 |
| JP | 2002-287817 A | 10/2002 |
| JP | 2002-358380 | 12/2002 |
| JP | 2003-005830 | 1/2003 |
| WO | WO-99/13388 A1 | 3/1999 |
| WO | WO-99/63409 A1 | 12/1999 |
| WO | WO-00/04427 A1 | 1/2000 |
| WO | WO-00/20939 A1 | 4/2000 |
| WO | WO-00/49471 A1 | 8/2000 |
| WO | WO-00/62256 | 10/2000 |
| WO | WO-00/70417 A1 | 11/2000 |
| WO | WO-01/65875 A1 | 9/2001 |
| WO | WO-2010/120442 A2 | 10/2010 |

OTHER PUBLICATIONS

Examination Report for Application No. GB1301020.2, dated Oct. 17, 2018.

First Office Action for Chinese Application No. 201611078493.6, dated Jan. 2, 2019.

Search Report for Application No. GB1819954.7, dated Mar. 26, 2019.

Second Office Action for Chinese Application No. 201310038373.3, dated Mar. 8, 2017.

Substantive Examination Report for Philippine Application No. 1/2013/000021, dated Feb. 10, 2017.

"Components of GE Predictor.TM. Services," GE Industrial Systems, available at http://www.geindustrial.com/cwc/services?id=74 on Jul. 18, 2002 . . . .

"Customer Benefits," GE Industrial Systems, available at http://www.geindustrial.com/cwc/services?id=73 on Jul. 18, 2002 . . . .

"Customer Impact," GE Industrial Systems, available at http://www.geindustrial.com/cwc/services?id=73 on Jul. 18, 2002 . . . .

"Electrical Equipment Coverage," GE Industrial Systems, available at http://www.geindustrial.com/cwc/services?id=72 on Jul. 18, 2002 . . . .

"GE Predictor.TM. Services: GE Predictor Services Overview," GE Industrial Systems, available at http://www.geindustrial.com/cwc/services?id=71 on Jul. 18, 2002 . . . .

First Office Action for Chinese Application No. 200480003745.8, dated Oct. 26, 2007.

Fujimoto et al., "Parallel and Distributed Simulation in the Cloud," SOS M&S Magazine—Society for Modeling and Simulation International (2010).

Great Britain Search Report for Application No. GB1301020.2, dated Jul. 20, 2013.

Hussain, "Review of the applications of neural networks in chemical process control-simulation and online implementation," Artificial Inteligence in Engineering, 13:55-68 (1999).

International Preliminary Report on Patentability for Application No. PCT/US2002/005635, dated Jun. 5, 2003.

International Preliminary Report on Patentability for Application No. PCT/US2004/002396, dated Aug. 12, 2005.

International Search Report and Written Opinion for Application No. PCT/US2004/002396, dated Jun. 24, 2004.

International Search Report for Application No. PCT/US2002/005635, dated Mar. 13, 2003.

Itou et al., "EJX910 Multivariable Transmitter," Yokogawa Technical Report English Edition, 42:13-16 (2006).

Notice of Reasons for Rejections for Japanese Application No. 2006-503113, dated Dec. 18, 2009.

Notice of Reasons for Rejections for Japanese Application No. 2006-503113, dated May 19, 2009.

Notification of Reexamination for Chinese Application No. 200480003745.8, dated Jul. 5, 2010.

U.S. Appl. No. 09/257,896, dated Feb. 25, 1999. (Abandoned).

Second Office Action for Chinese Application No. 200480003745.8, dated Apr. 11, 2008.

(56) References Cited

OTHER PUBLICATIONS

Third Office Action for Chinese Application No. 200480003745.8, dated Dec. 12, 2008.
Third Office Action for Chinese Application No. 2012111900956920, dated Nov. 22, 2012.
Yang et al., "Time delay and data loss compensation for Internet-based process control systems," Transactions of the Institute of Measurement and Control 27(2):103-118 (2005).
Examination Report for Application No. GB1819954.7, dated May 8, 2019.
Second Office Action for Chinese Application No. 201611078493.6, dated Sep. 4, 2019.

* cited by examiner

METHOD AND APPARATUS FOR DEPLOYING INDUSTRIAL PLANT SIMULATORS USING CLOUD COMPUTING TECHNOLOGIES

CROSS-REFERENCE TO RELATED APPLICATIONS

This application is a divisional of U.S. patent application Ser. No. 13/357,341, filed on Jan. 24, 2012, which is incorporated herein by reference in its entirety.

DESCRIPTION OF THE RELATED ART

Distributed process control systems, like those typically used in power generation, chemical manufacturing, petroleum processing or other process plants, typically include one or more process controllers communicatively coupled to one or more field devices via analog, digital or combined analog/digital buses. The field devices, which may be, for example, valves, valve positioners, switches, transmitters (e.g., temperature, pressure, level and flow rate sensors), burners, etc. are located within the process environment and perform process functions such as opening or closing valves, measuring process parameters, etc. in response to control signals developed and sent by the process controllers. Smart field devices, such as the field devices conforming to any of the well-known Fieldbus protocols may also perform control calculations, alarming functions, and other functions commonly implemented within or by a process controller. The process controllers, which are also typically located within the plant environment, receive signals indicative of process measurements made by the field devices and/or other information pertaining to the field devices and execute a control application that runs, for example, different control modules which make process control decisions, generate process control signals based on the received information and coordinate with the control modules or blocks being performed in the field devices, such as HART and Fieldbus field devices. The control modules within the controller send the process control signals over the communication lines to the field devices to thereby control the operation of the process.

Information from the field devices and the controller is usually made available over a data highway to one or more other computer devices, such as operator workstations, personal computers, data historians, report generators, centralized databases, etc., typically placed in control rooms or other locations away from the harsher plant environment. These computer devices may also run applications that may, for example, enable an operator to perform functions with respect to the process, such as changing settings of the process control routine, modifying the operation of the control modules within the controller or the field devices, viewing the current state of the process, viewing alarms generated by field devices and controllers, keeping and updating a configuration database, etc.

As an example, the Ovation® control system, sold by Emerson Process Management, includes multiple applications stored within and executed by different devices located at diverse places within a process plant. A configuration application, which resides in one or more operator workstations, enables clients to create or change process control modules and to download these process control modules via a data highway to dedicated distributed controllers. Typically, these control modules are made up of communicatively interconnected function blocks, which are objects in an object oriented programming protocol and which perform functions within the control scheme based on inputs thereto and provide outputs to other function blocks within the control scheme. The configuration application may also allow a designer to create or change operator interfaces which are used by a viewing application to display data to an operator and to enable the operator to change settings, such as set points, within the process control routine.

Each of the dedicated controllers and, in some cases, field devices, stores and executes a controller application that runs the control modules assigned and downloaded thereto to implement actual process control functionality. The viewing applications, which may be run on one or more operator workstations, receive data from the controller application via the data highway and display this data to process control system designers, operators, or clients using the user interfaces, and may provide any of a number of different views, such as an operator's view, an engineer's view, a technician's view, etc. A data historian application is typically stored in and executed by a data historian device that collects and stores some or all of the data provided across the data highway while a configuration database application may executed in a still further computer attached to the data highway to store the current process control routine configuration and data associated therewith. Alternatively, the configuration database may be located in the same workstation as the configuration application.

As noted above, operator display applications are typically implemented on a system wide basis in one or more of the workstations and provide preconfigured displays to the operator or maintenance persons regarding the operating state of the control system or the devices within the plant. Typically, these displays take the form of alarming displays that receive alarms generated by controllers or devices within the process plant, control displays indicating the operating state of the controllers and other devices within the process plant, maintenance displays indicating the operating state of the devices within the process plant, etc. These displays are generally preconfigured to display, in known manners, information or data received from the process control modules or the devices within the process plant.

In some known systems, displays are created through the use of objects that have a graphic associated with a physical or logical element and that is communicatively tied to the physical or logical element to receive data about the physical or logical element. The object may change the graphic on the display screen based on the received data to illustrate, for example, that a tank is half full, to illustrate the flow measured by a flow sensor, etc. While the information needed for the displays is sent from the devices or configuration database within the process plant, that information is used only to provide a display to the client containing that information. As a result, all information and programming that is used to generate alarms, detect problems within the plant, etc. must be generated by and configured within the different devices associated with the plant, such as controllers and field devices during configuration of the process plant control system. Only then is this information sent to the operator display for display during process operation.

Moreover, it is frequently desirable to develop a simulation system within the plant to simulate the operation of the control network as connected within the plant. Such a simulation system may be used to test the operation of the plant in response to new or different control variables, such as set-points, to test new control routines, to perform optimization, to perform training activities, etc. As a result, many simulation systems have been proposed and used in process plants. None-the-less, only the most complex simulation systems are typically able to perform high fidelity simulation of the process plant because of the ever changing conditions within the plant, including the degradation of devices over time, as well as the presence of unaccounted for disturbance variables within the plant. Moreover, in many known controller systems, it can be difficult to set up or create a simulation of the process plant or a portion of the process plant as simulation activities are performed separately from the display and control activities performed in the on-line environment of the process plant. As a result, the simulation system is not closely coordinated with the actual operation of the control network within the process plant. In other words, simulation systems, once set up, are typically run separately from the controllers within the plant to simulate the operation of the process control network installed within the plant, and therefore these simulation systems can easily become de-tuned from the actual control network within the plant. Moreover, the process model used in the simulation system may quickly diverge from the actual process operation. As a result, it can be difficult to integrate the simulation system with the operator displays or with the control modules being implemented within the plant.

Still further, simulation is made more difficult in a power plant control system as well as some other types of control systems where it is typical for the control functions to be segmented into various different control machines (or processors) based on criteria such as the physical location of the associated plant equipment, the dynamic properties of the process variables of interest and fault tolerance and redundancy considerations. The physical location of the affected equipment is important due mainly to mechanical considerations and constraints associated with such things as the length of the corresponding wires. Here, the process dynamics affect the control function segmentation by placing requirements and constraints on the execution period of the control functions that are associated with the particular process variables, all of which must be simulated within the simulation system. In power plants, the fault tolerance considerations are aimed at reducing the impact of processor and computer failures on electricity generation.

Further, creating simulations at a plant site can be expensive. The processors and related equipment needed to execute a simulation are complicated and costly. The equipment also needs space and a proper operating environment which can be difficult to create and maintain in a plant environment. The simulation application also may be expensive, complicated and operator intensive. Related, the simulation application is specialized and often needs experienced operators to effectively operate. In addition, there are continuing costs such as maintaining the equipment and software, updating the equipment and software, supporting the equipment and software, etc. Estimates of the costs range from $500,000 for a small system to $2,000,000 for a bigger system.

In any event, while most utilities and other plants incorporate an off-line simulator for operator training as well as engineering analysis, this traditional approach treats the control and simulation functions as two totally separate and diverse entities, each of which must be separately created, run and configured to operate correctly. As a result, the simulation systems used in these plants can quickly become out of tune with the process and thus may not be very accurate, and these simulation systems are typically not very easy to use. In addition, the local systems are expensive to create, operate and maintain.

SUMMARY

A process control simulation technique is created in a network cloud using data communicated from one or more plants using a thin or light client at the plant. The simulation performs real-time simulation or prediction of an actual process control network as that network is running within a process plant in a manner that is synchronized with the operation of the actual process control network. In particular, this synchronized simulation system is automatically updated periodically during the operation of the actual process control network to reflect changes made to the actual process control network, as well as to account for changes which occur within the plant itself, i.e., changes which require updating a process model used within the simulation system as the relevant data is communicated in a timely manner to the network computers operating in the network cloud. The synchronized, cloud based simulation system described herein provides for a more cost effective and usable simulation system, as the plant models used within the simulation system are synchronized with and up-to-date with respect to the current process operating conditions but the specialized knowledge to set up, operate and maintain the simulations are completed by trained operators in the network cloud.

Additionally, the disclosed simulation system is very accurate as it uses process models developed from the current state of the process at the time that the simulation system is initiated to perform a particular simulation. Still further, this simulation system is easy to use, as it can use the same or similar user interface applications as are used within the process control network to perform man-machine interface (MMI) activities while minimizing the difficult set-up, operation and maintenance as these activities will occur in the network cloud. Likewise, this simulation system can be initialized and used at any time during operation of the process plant without any significant configuration or set-up activities, because the simulation system is always up-to-date with respect to the control network actually being used within the process plant when it is initially placed in a prediction mode. Thus, the operator merely needs to specify any changes to the simulation control system that are to be used in the simulation, and the simulation system is ready to operate to perform accurate simulation or prediction, as the simulation system remains synchronized with the process plant.

Further, the cloud based simulation system is more cost effective than local simulations that operate at the plant. In previous simulations that operated at the plant, the simulation applications required a significant investment in hardware, software, space, hvac and operators to make the system function properly. In the cloud based simulation system described herein, the software at the plant is a "thin" software application that can operate, for example and not limitation, on a traditional personal computer. The thin software may collect and communicate process related data to the network cloud and render displays related to the simulation system that operates in the network cloud while the challenging simulation software may operate in the network cloud.

In the claimed network cloud based simulation, the investment in computing systems and operators are significantly less as many clients may share the processors and operators that are available in the network cloud. In addition, more than just having a workstation that operates remotely, the cloud allows for multiple computing devices to be available to operate numerous simulations or other applications at the same time, thereby creating improved response and availability for the simulation system. Further, the central cloud-based design allows for the central collection and storage of data, making centralized process control data analysis even easier and more efficient.

Generally speaking, the simulation system described herein alternates between executing in one of two different modes, including a tracking mode and a prediction mode. In the tracking mode, the simulation system operating in the network cloud communicates with the process control network through a supervisor client at the plant to obtain various types of state data from the process control network that is needed to keep both the process control network and the process model of the simulation system synchronized with the actual process control network and with the process being controlled. This information may include, for example, state variables defining the operation of the process controllers, measured process variables, and process control signals as developed by the controllers within the process plant. This information may be received periodically during operation of the process control network, and in one embodiment, may be received at the scan rate of the process controllers within the actual process control network (i.e., at the rate at which the process controllers operate to produce new control signals). During the tracking mode, the simulation system in the cloud uses the collected state information to develop an updated controller state variable for use in configuring the simulated control network and updates a process model to model the process based on the most recently collected information.

During the prediction mode, the operator may specify new control variables, such as set-points, to be used during the simulation, and the simulation system in the cloud then operates to simulate control of the process, based on the most recent process model. The simulation system in the cloud may be operated in a real-time sub-mode, in a fast-time sub-mode or in slow-time sub-mode, depending on the desires of the operator. In any event, the simulation system in the cloud may, for example, simulate the operation of the actual process control network in response to a changed control variable, a changed control routine, a process disturbance, etc. Alternatively, if desired, the simulation system in the cloud may operate to simulate the operation of the process plant in fast time to determine an indication of the steady state operation of the process at a control horizon, or to otherwise predict the operation of the plant or some variable thereof at some future point in time.

As the simulation system in the network cloud is in communication with the actual process control network, when it enters the prediction mode, it is synchronized with the actual process control network and the process plant as currently operating and the simulation system in the network cloud will provide an accurate simulation or prediction of the operation of the process plant in response to the control variables used in the simulation. Moreover, because the simulation system in the network cloud is synchronized with the process plant upon activation of the simulation system, the operator at the plant or in the cloud does not need to perform any significant configuration or updating of the simulation system prior to initiating the simulation system, making this system easy to use. Still further, because the simulation system in the network cloud is synchronized with the process control network, the simulation system may use the local client to display the same user interface routines, making the local simulation system display look and feel the same as the control system at the plant, again making the simulation system easier to use and understand.

Finally, a method of providing simulation services is described. In general, the plant and simulations are reviewed for complexity and to determine the expected work to create the simulation in the network cloud. Once the complexity is determined, a minimum level of services may be determined based on the determined complexity. The minimum level of services may then be used to determine a suggested price for the minimum services which may be communicated to the client. In addition, other services which may be useful may be determined by reviewing the plant and simulation data and the price for the suggested other services may be determined and communicated to the client.

DESCRIPTION

Figure 1:
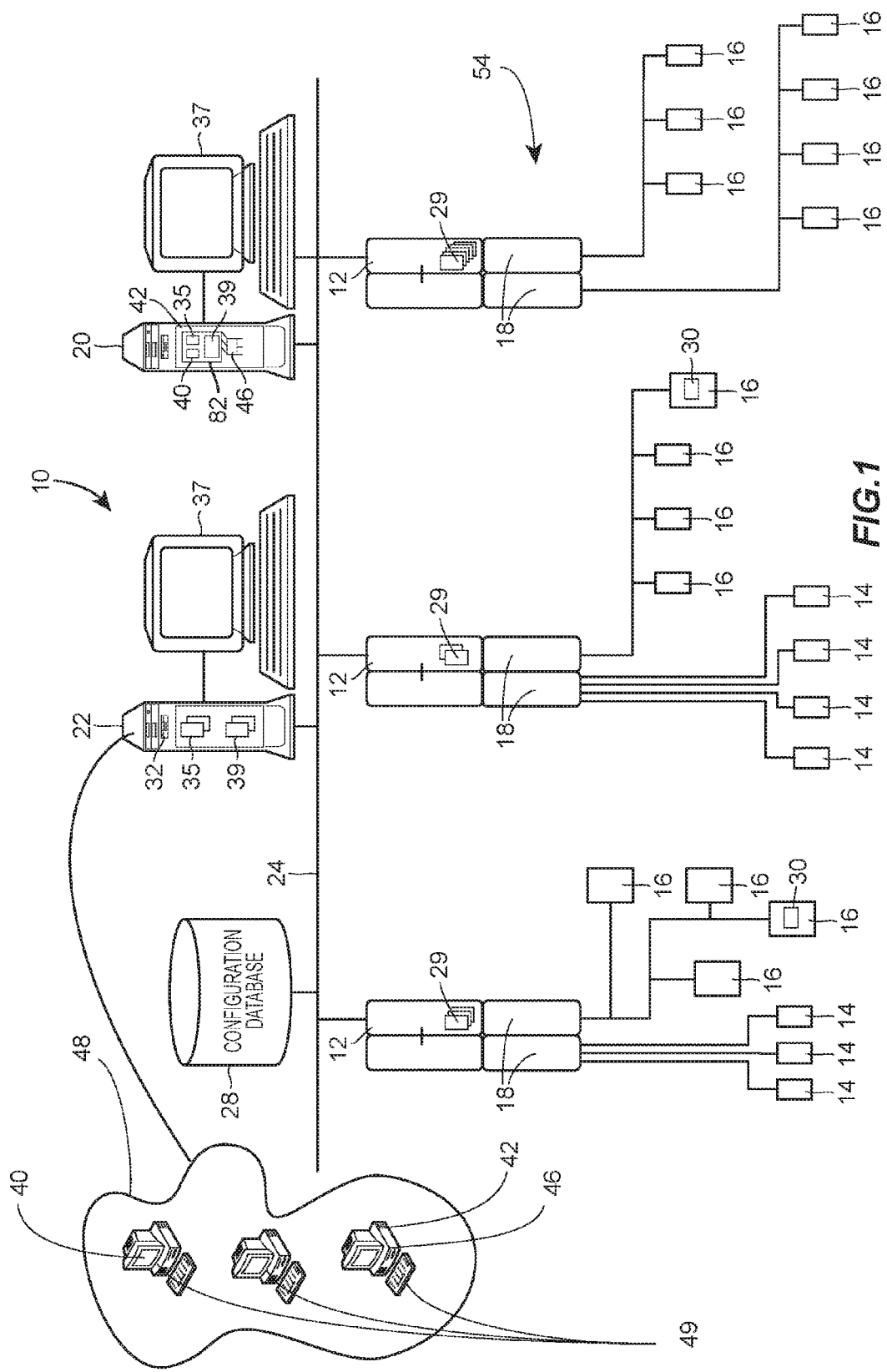
FIG. 1 is a block diagram of a distributed process control network located within a process plant including a computing device in communication with a network cloud of computing devices that implements a simulation system configured to be synchronized with the operation of an actual process control network, to thereby simulate the operation of the process plant.

Referring now to FIG. 1, an example control network for process plant 10, such as that associated with a power generation plant, is illustrated in detail. The process plant 10 of FIG. 1 includes a distributed process control system having one or more controllers 12, each of which is connected to one or more field devices 14 and 16 via input/output (I/O) devices or cards 18 which may be, for example, Fieldbus interfaces, Profibus interfaces, HART interfaces, standard 4-20 ma interfaces, etc. The controllers 12 are also coupled to one or more host or operator workstations 20 and 22 via a data highway 24 which may be, for example, an Ethernet link. A database 28 may be connected to the data highway 24 and operates as a data historian to collect and store parameter, status and other data associated with the controllers 12 and field devices 14, 16 within the plant 10. Additionally or alternatively, the database 28 may operate as a configuration database that stores the current configuration of the process control system within the plant 10 as downloaded to and stored within the controllers 12 and field devices 14 and 16. While the controllers 12, the I/O cards 18 and the field devices 14 and 16 are typically located down within and are distributed throughout the sometimes harsh plant environment, the operator workstations 20 and 22 and the database 28 are usually located in control rooms or other less harsh environments easily assessable by controller or maintenance personnel.

As is known, each of the controllers 12, which may be by way of example, the Ovations controller sold by Emerson Process Management Power and Water Solutions, Inc., stores and executes a controller application that implements a control strategy using any number of different, independently executed, control modules or blocks 29. Each of the control modules 29 can be made up of what are commonly referred to as function blocks wherein each function block is a part or a subroutine of an overall control routine and operates in conjunction with other function blocks (via communications called links) to implement process control loops within the process plant 10. As is well known, function blocks, which may but need not be objects in an object oriented programming protocol, typically perform one of an input function, such as that associated with a transmitter, a sensor or other process parameter measurement device, a control function, such as that associated with a control routine that performs proportional-integral-derivative (PID), fuzzy logic, etc. control, or an output function that controls the operation of some device, such as a valve, to perform some physical function within the process plant 10. Of course hybrid and other types of complex function blocks exist such as model predictive controllers (MPCs), optimizers, etc. While the Fieldbus protocol and the Ovation® system protocol use control modules and function blocks designed and implemented in an object oriented programming protocol, the control modules could be designed using any desired control programming scheme including, for example, sequential function chart, ladder logic, etc. and are not limited to being designed and implemented using the function block or any other particular programming technique.

In the plant 10 illustrated in FIG. 1, the field devices 14 and 16 connected to the controllers 12 may be standard 4-20 ma devices, may be smart field devices, such as HART, Profibus, or FOUNDATION® Fieldbus field devices, which include a processor and a memory, or may be any other desired type of field device. Some of these devices, such as Fieldbus field devices (labeled with reference number 16 in FIG. 1), may store and execute modules, or sub-modules, such as function blocks, associated with the control strategy implemented in the controllers 12. Function blocks 30, which are illustrated in FIG. 1 as being disposed in two different ones of the Fieldbus field devices 16, may be executed in conjunction with the execution of the control modules 29 within the controllers 12 to implement one or more process control loops, as is well known. Of course, the field devices 14 and 16 may be any type of devices, such as sensors, valves, transmitters, positioners, etc. and the I/O devices 18 may be any types of I/O devices conforming to any desired communication or controller protocol such as HART, Fieldbus, Profibus, etc.

Still further, in a known manner, one or more of the workstations 20 and 22 may include user interface applications to enable a client, such as an operator, a configuration engineer, a maintenance person, a user, etc. to interface with the process control network within the plant 10. In some embodiments, the user interface application may be a "thin" client that displays data determined in a network cloud 48. As an example, the display data may be generated at the network cloud 48 and may be communicated as HTML data to a rendering module, such as a web browser, and is then displayed on the display 37. In other embodiments, the user interface application may execute on a local workstation 22.

The workstation 22 is illustrated as including one or more user interface applications 35 may which may be executed on a processor within the workstation 22.

In virtually all embodiments, the user interface application 35 may communicate with the database 28, the control modules 29 or other routines within the controllers 12 or I/O devices 18, with the field devices 14 and 16 and the modules 30 within these field devices, etc. to obtain information from the plant from, for example, a supervisor 32, and the information may relate to the ongoing state of the process control system. The user interface applications 35 may process and/or display this collected information on a display device 37 associated with one or more of the workstations 20 and 22. The collected, processed and/or displayed information may be, for example, process state information, alarms and alerts generated within plant, maintenance data, etc.

Likewise, one or more applications 39 may be stored in and executed in the workstations 22 and 20 or in the network cloud 48 to perform configuration activities such as creating or configuring the modules 29 and 30 to be executed within the plant, to perform control operator activities, such as changing set-points or other control variables, within the plant, etc. Of course the number and type of routines 35 and 39 is not limited by the description provided herein and other numbers and types of process control related routines may be stored in an implemented within the workstations 20 and 22 if desired.

The workstation 20 of FIG. 1 is also illustrated as including a supervisor application 32. The supervisor application 32 may be a "light" or "thin" application that provides limited functionality locally and is not processor intensive. The supervisor application 32 may collect and communicate supervisor data which may include control system and process system information relevant to the simulation application 40. The communication may be provided using any known or standard interface protocols, such as OPC, TCP/IP etc.

Figure 2:
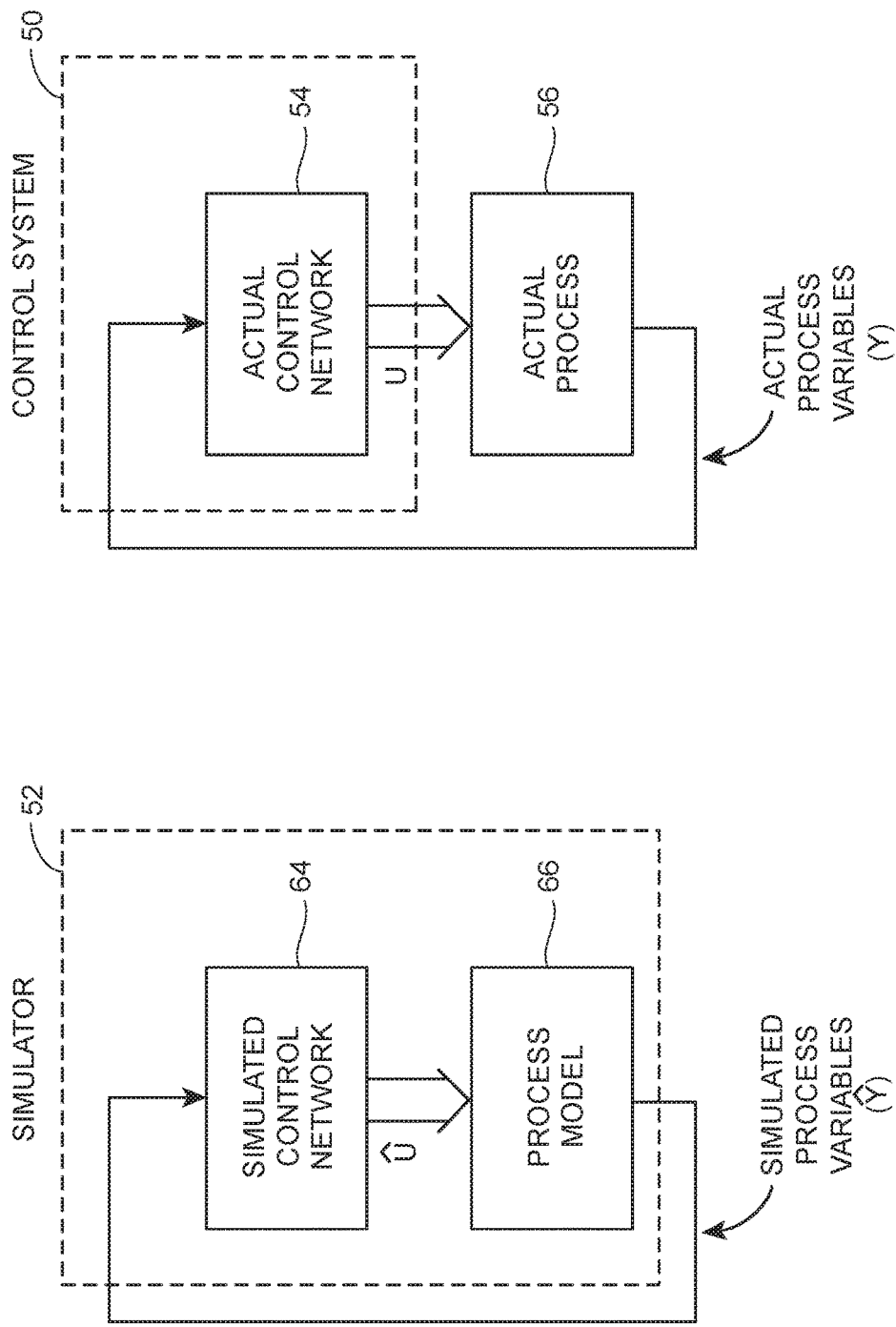
FIG. 2 is a logical block diagram of a process plant control system and a simulation system for simulating the process plant control system.

The supervisor application 32 may be a complete application or may have different modules such as a data gathering module, a data packaging module, a data communication module, a data receiving module, a change detector module 82, etc. In some embodiments, the supervisor data may be "pulled" from the control system and process system in which the systems may be queried for the desired data. In other embodiments, the supervisor data may be "pushed" to the supervisor 32 from the control system 50 and process system 52 (FIG. 2). Of course, a combination of "pushing" and "pulling" to obtain the supervisor data is possible and is contemplated.

Figure 3:
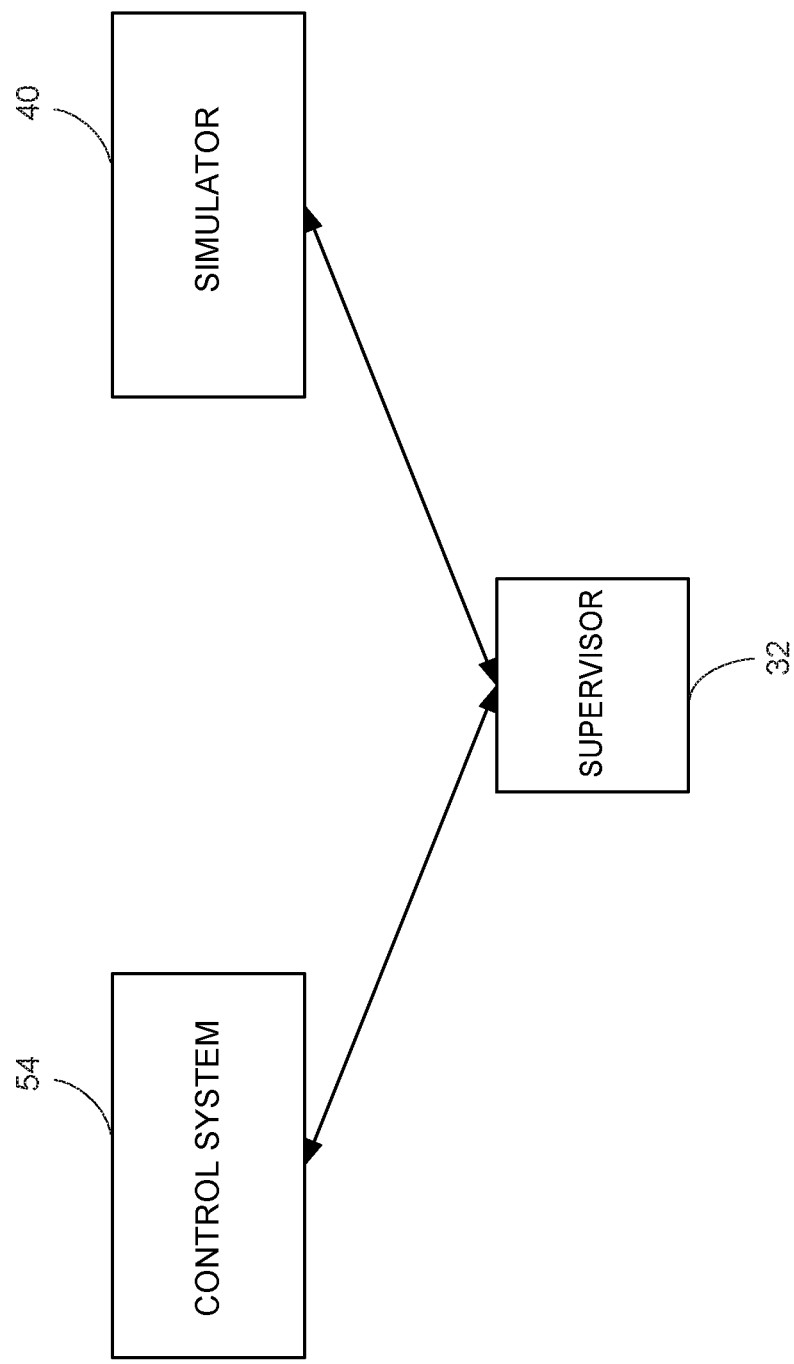
FIG. 3 is a high level logical block diagram of the control system, the simulator and the supervisor.

FIG. 3 is a high level illustration of the logical communication between the supervisor, the simulation application 40 and the actual process control system 54. In one embodiment, the supervisor application 32 is located in a computing device in the plant of the relevant control system 54 and the simulator is located remote in one or more computing devices 49 in the network cloud 48. The supervisor application 32 communicates the necessary data from the control system 54 to the simulator 40 operating in the network cloud 48.

In some embodiments, the supervisor application 32 may buffer the supervisor data and communicate it to the simulation application 40 when a threshold size is met, an amount of time has passed or an amount of data is gathered. For example, the supervisor data may be communicated periodically. The period of the communication may relate to the control system operating period and process system operating period. For example, if the control system 50 obtains new data every 0.5 second, the period of communication from the supervisor application 32 to the simulation application 40 may be every 0.5 second. Of course, in some situations, it may makes sense to communicate between the supervisor application 32 and the simulation application 40 more frequently and in other cases, the communication period may be greater. In other embodiments, the supervisor application 32 may stream or send virtually instantly the supervisor data to the simulation application 40. Of course, while the supervisor data may be streamed, it may be put into a format or scheme that makes communication to the simulation application 40 more appropriate, reliable, easily converted, etc.

In some additional embodiments, a change detector 82 may be part of the simulation system 52. In some embodiments, the change detector 82 is in communication with the supervisor 32. For example, in FIG. 7, the change detector 82 is illustrated as being part of the supervisor 32, however, as will be explained, the change detector 82 may be in communication with the simulation application 40 in a variety of ways and it does not necessarily have to be physically connected to the supervisor 32. The change detector 82 may track past values from the process control network 54 and may only communicate changes in the values from the process control network 54. In this way, the amount of data communicated from the supervisor 32 to the simulation device 52 may be reduced, thereby saving communication bandwidth, storage space and processor usage.

The change detector 82 may also be in position to monitor the process control network 54, the simulated control network 64 and the process model 66 and compare the received values from the process control network 54, the simulated control network 64 and the process model 66 to values that have been previously been received and stored. If the received values from the process control network 54, the simulated control network 64 and the process model 66 are different from the previously received values, the new values may be communicated to the update module 70. In this way, only updated values are communicated, thereby saving communication bandwidth, storage capacity and processor usage.

Figure 7:
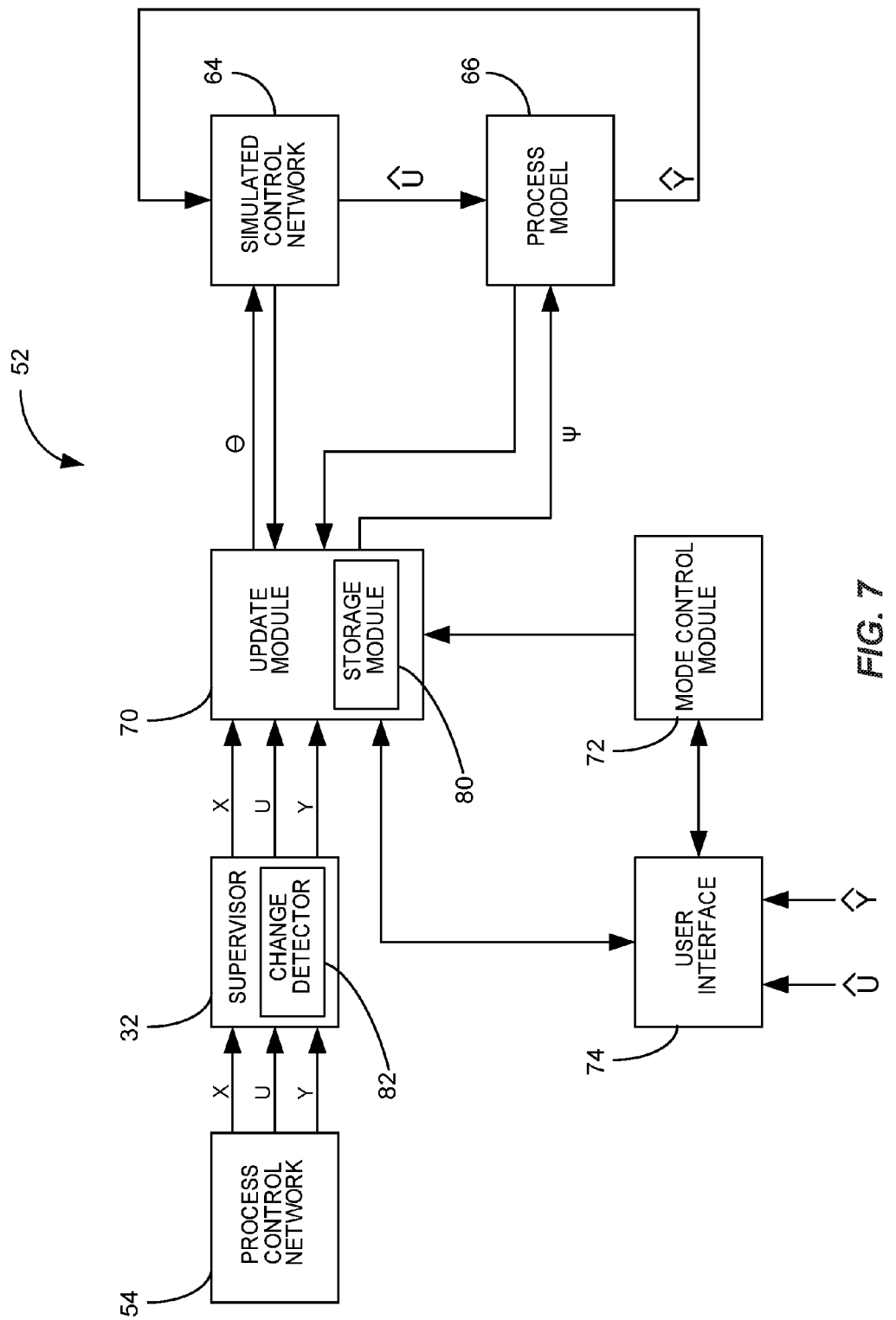
FIG. 7 is a block diagram of a simulation system that implements the features described herein.

Referring briefly to FIG. 7, in yet another embodiment, the change detector 82 is in communication with the update module 70. The change detector 82 may review the incoming data from the supervisor 32 and may only pass along process control network data that is different than the process control network data that is already stored in the storage module 80 or communicated to the simulation control network 64 or the process model 66. Thus, only new or updated process control network 54 data may be stored in the storage module 80 or communicated to the simulation control network 64 or the process model 66, thereby saving storage space, communication bandwidth to simulation control network 64 or the process model 66 and processor operation. Further, the change detector 82 will keep the storage module 80 from being simply a data historian but will add intelligence to the storage module 80 to avoid storing or communicating all data, rather than just the data that has changed.

Referring again to FIG. 1. the simulation application 40 may operate in a different location than the process plant 10, such as in a remote network 48. In some embodiments, the remote network 48 may be thought of as a network or cloud of computing devices 49. The remote network cloud 48 may be made up of one or more computing devices 49 such as servers, workstations, personal computers, etc., that execute computer executable applications and may be reachable through one or more forms of electronic communication. The actually location of the computing devices 49 may not matter. The computing device 49 may be in the same location or may be spread out around the world but still be in communication with each other. In some embodiments, the computing devices 49 in the cloud 48 may work together to share computing workload and in other embodiments, each of the computing devices 49 may execute specific computing applications. As would be expected, the computing devices 49 may have one or more processors 46 and one or more memories 42 and the processors 46 and memories 42 may be physically configured according to the computer executable instructions or applications.

The simulation application 40 may include a process plant simulator 52, a user interface application 74 and data structures for performing synchronized simulation of the process plant 10 in the manner described herein. The simulation application 40 may be accessed by any authorized client (such as a configuration engineer, an operator or some other type of user) to perform simulation of the process plant control network 54 being implemented by the control blocks 29 and 30 as well as other controller routines executed within the controllers 12 and possibly the field devices 14, 16. The simulation application 40 may be protected by passwords, blind key exchanges, or other security measures that may be appropriate. The passwords may be specific to a user, to a workstation, to a plant or module.

The simulation application 40 enables a client to perform different simulation and prediction activities with respect to the process plant 10 while the control system of the process plant 10 remains operational and on-line to control the plant 10. As illustrated in FIG. 1, the simulation application 40 is stored in a memory 42 of one or more of the remote computing devices 49 in the network cloud 48, and each of the components of the simulation application 40 may be adapted to be executed on a processor 46 associated with the remote computing device 49. While the entire simulation application 40 is illustrated as being stored in one of the remote computing devices 49, some components of the simulation application 40 could be stored in and executed in other workstations or computing devices 49 in communication with the plant 10 or with the simulation application 40 or with the remote workstation 49, such as other computing devices 49 in the network cloud 48. Similarly, the simulation application 40 may be broken up and executed on two or more computers 49 or machines that may be configured to operate in conjunction with one another, for example, in a network cloud 48.

Furthermore, the simulation application 40 may provide display outputs to the display screen 37 associated with the remote workstation 49 or any other desired display screen or display device 37, including hand-held devices, laptops, tablets, cellular phones, other workstations, printers, etc. For example, the simulation application 40 may display input displays that are similar to the actual control displays from the process control system. In such an embodiment, the thin client at the plant only has to generate a display, not calculate and create the data that is in the display.

Generally speaking, the simulation application 40 provides for or enables the simulation of the operation of the process plant 10 and in particular, the simulation of the process plant control system 54 implemented by the control routines 29 and 30 within the controllers 12 and field devices 14 and 16, in conjunction with the actual plant being controlled. While the plant that is being controlled will be described herein as a power generation plant being controlled using distributed control techniques, the synchronized simulation technique described herein can be used in other types of plants and control systems, including industrial manufacturing plants, water and waste water treatment plants, as well as control systems implemented centrally or within a single computer, and therefore not distributed throughout the plant 10.

FIG. 2 generally illustrates a local (plant 10 based) process control system 50 and a simulation system 52 implemented remote from plant 10 of FIG. 1. In particular, the process control system 50 includes an actual process control network 54 communicatively and physically coupled to a process 56. As will be understood, the actual process control network 54 includes the control modules 29 and 30 of FIG. 1 as well and any other control routines disposed in and executed within the various control devices (e.g., controllers 12) and field devices (e.g., devices 14 and 16) of the plant 10 of FIG. 1. Likewise, the actual process 56 includes the units, machines, devices and associated hardware set up to implement the process being controlled. For example, in a power generation plant, the process 56 may include generators, fuel delivery systems including heat exchanges, condensers, steam generators, valves, tanks, etc. as well as sensors and transmitters disposed within the plant to measure various process parameters or variables.

As illustrated in FIG. 2, the actual process control network 54 includes the controllers which produce one or more control signals to be delivered to the various control devices within the plant 56 and which operate to control the plant 56 according to some specific control technique. These control signals are illustrated by the vector U in FIG. 2 to indicate that the actual process control network 54 may provide a vector of control signals to the process 56 to control the operation of the plant. Likewise, as illustrated in FIG. 2, a vector Y of process variables are measured within the process 56 (such as by sensors, etc.) and are delivered as feedback signals to the process control network 54 for use in producing the control signals U. Of course, the actual control network 54 can include any desired types of controllers which implement any desired types of control routines or techniques, such as PID, fuzzy logic, neural network, model predictive control routines, etc.

As illustrated in FIG. 2, the simulation system 52 includes a simulated control network 64 and a process model 66. The simulated control network 64 is, generally speaking, a copy of the actual process control network 54 including a copy or a duplicate of the control routines associated with and/or running within the actual controllers and other devices of the process control network 54. However, instead of being distributed within multiple different devices, the simulated control network 64 may include one or more communicatively connected control modules that are implemented on one or more computing devices, such as the remote workstation 49 in the network cloud 48 of FIG. 1. Such a simulation system 40 that stores and simulates various control routines designed to be implemented in different computers as part of a distributed control network is described in detail in U.S. patent application Ser. No. 09/510,053, filed on Feb. 22, 2000, entitled "Integrating Distributed Process Control System Functionality on a Single Computer" the disclosure of which is hereby expressly incorporated by reference herein.

In any event, the simulation system 52 may be implemented as part of the simulation application 40 of FIG. 1. Moreover, the process model 66 used within the simulation system 52 is designed and configured to model the process 56, and may implemented as any desired or suitable type of process model, such as an n.sup.th order transfer function model, a neural network model, etc. Of course, the type of model to be used may be chosen as the best type of model for the particular type of plant or process being modeled, as well one that enables on-line updating capabilities as described in more detail below. Still further, if desired, the process model 66 may be made up of a plurality of individual process models, each modeling or associated with a different part of the plant 10, such as with a different control loop within the plant 10.

The overall concept of the simulation approach as outlined in FIG. 2 provides a simulation system 52 that includes a control network 64 developed as a copy of the actual control network 54 and a process model 66 that models the actual process 56 of the plant. In this configuration, the control network 54 and therefore the simulated control network 66 includes of all functions and components that make up the actual control network 54 (e.g. the controllers, the function blocks, the man-machine-interface applications (MMIs), etc. of the actual control network). Of course, the simulated control network 64 of the simulation system 52 may be developed by copying the actual control routines (e.g., the control routines 29 and 30 of FIG. 1), the user interface applications 74, the configuration applications, etc. as stored in, for example, the configuration database 28 of FIG. 1, the controllers 12, the field devices 4, 16, the workstations 20, 22, etc., along with storing data or other information related to identifying the associated inputs and outputs of the control routines within the process plant. The supervisor application 32 may assist in communicating the actual routines and related data to the simulation system 52. The input/output signal identification data may be helpful to enable the simulation system 52 to communicate with the control system 50 through the supervisor application 32 during operation of the control system 50 to thereby synchronize the operation of the simulation system 52 with the control system 50 while the process plant is operating on-line.

As will be understood, during operation of the plant, the actual control network 54 operates in any usual or known manner to calculate the manipulated variables or control signals U which are applied to the process 56. The process 56 then responds by operating to develop actual process variables Y, which are measured by various sensors within the plant and are provided as feedback to the control network 54. The manipulated and process variables (U and Y, respectively) are shown as vector quantities to designate a plurality of values. Of course, each of the associated elements of these vector quantities may be made up of discrete values with respect to time, wherein the size of each time step is equal to the execution period of the associated control function, i.e., the scan or operation rate of the controllers.

As will be understood, the values of the manipulated variables (control signals) U are calculated at each time step, and the values of the process variables Y result from sampling the process variables at each time step. For the purpose of this discussion, the current time step is denoted as a time k and thus the values of the manipulated variables and the process variables at the current time step are denoted as U.sub.k ($U_k$) and Y.sub.k ($Y_k$) respectively. Thus, according to this operation, the time response of the control network 54 is determined by the vectors U, Y and a vector of internal state variables X which defines the specifics of the control procedures (or controller configurations) used in the control network 54, e.g., the controller gains or other parameters defining the specifics of the control techniques implemented by the controllers within the control network

54. In other words, the elements of the state vector X define the internal variables that are used by the control functions to calculate the manipulated variables U. These state variables may be, for example, values that are a function of the tuning parameters or accumulated time values used by such functions as timers, integrator values utilized by PID controllers, neural network weighting coefficients used by neural network controllers, scaling factors used by fuzzy logic controllers, model parameters or matrices used by model predictive controllers, etc. These state values are also discrete with respect to time and thus the state vector X at the kth time step is denoted as $X_k$. The collective set of state vectors U, Y, X can then be said to define the overall state of the control system. These values are continuously calculated by the control system.

Figure 4:
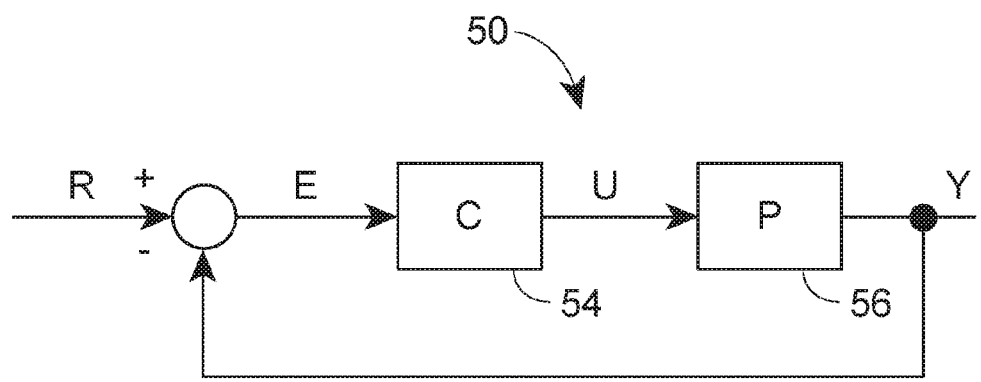
FIG. 4 is a simplified logical block diagram of a control loop of the plant control system shown in FIG. 2.

Referring now to FIG. 4, the control system 50 of FIG. 2 is illustrated in block diagram form as a feedback control loop. In this case, the actual control network 54 is represented by the block denoted as C. The process 56 is represented by the block denoted as P. Moreover, in this case, the input to the control network 54 is shown as a vector of set-points R which are compared to the measured or determined process variables Y to produce an error vector E which, in turn, is used by the control network 54 to produce the control signal or manipulated variable vector U. Of course, the elements of the set-point vector R represent the desired values for the process variables Y that are to be controlled, and these set-point values are generally determined by an operator or an optimizer routine (not shown). In the case of a power plant control system, these set-point values may be the desired values of flow, pressure, temperature, megawatts, etc. for the associated process variables within the power generation equipment.

Figure 5:
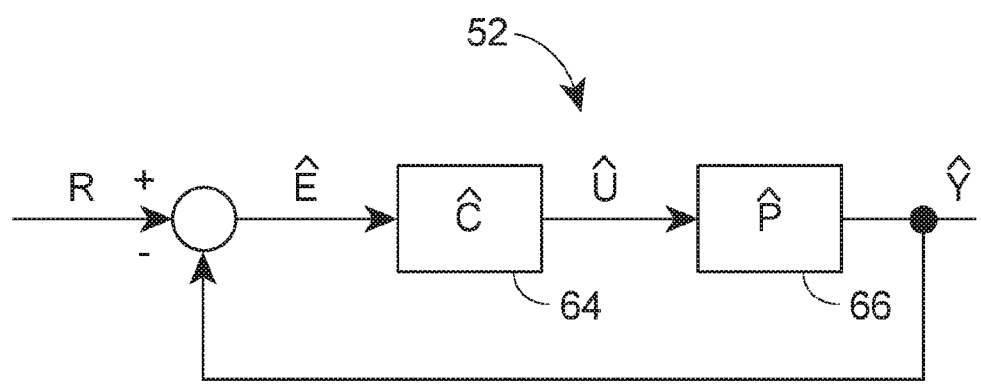
FIG. 5 is a simplified logical block diagram of a simulated control loop implemented by the simulation system shown in FIG. 2.

In a similar manner, the simulation system 52 is shown in block diagram form in FIG. 5. The same vector R of set-point values from the actual control network 54 is input through the supervisor application 32 (FIG. 3) to the simulation system 52. Here, the simulated control network 64 is denoted by the block $\hat{C}$ and is a replication of the control network 54 in terms of controller operation. Thus, all of the controllers, function block and algorithms that make up the actual control network 54 are replicated in the simulated control network 64. The simulated manipulated variables or control signals are show as being produced or calculated by the simulated control network 64 and provided to the process model 66.

In the remote simulation system 52 operating in the network cloud 48, however, the values of the process variables are calculated using a mathematical model of the process 56, referred to as the process model 66 and denoted as $\hat{P}$. Of course, the exact structure of the process model 66 can vary and, furthermore, various different model structures can be utilized for various different parts of the process 56 so that, for example, each process variable can utilize or be determined by a unique process model structure. Applicable model structures that may be used include first principle (differential equation) models, transfer function (ARX) models, state space models, neural network model, fuzzy logic models, etc.

Like the actual control system 50, the time response of the simulation system 52 is completely described by the $\hat{U}$, $\hat{Y}$ and $\hat{X}$ vectors. Here, the elements of the simulator state vector $\hat{X}$ contain the identical state variables X as in the actual control system 50. However, the simulator state vector $\hat{X}$ also includes additional elements which are the internal state variables associated with the process model 66, and these variables are used by the process model 66, along with the manipulated variables, to calculate the simulated process variables $\hat{Y}$. Thus the simulator state vector $\hat{X}$ is an augmentation of the control system state vector X where $\hat{X}$ includes the control system state vector (denoted as $\theta$ or θ) and the vector of process model internal state variables (denoted as $\psi$ or Ψ). Here, the values of θ are identical to X.

The simulator model architecture is preferably such that the value of each of the model internal state variables ($\psi_k$) at the kth time step can be calculated using the $U_{k-1}$ and $Y_k$ vectors from the control system. Of course, the details of the specific calculations are specific and particular to the particular model structure that is employed, and these calculations are known to those of ordinary skill in the art. Moreover, it will be realized that the process state variables that are calculated by the simulator system can be a function of the process variables and manipulated variables as well as, in some instances, the process variables and/or the manipulated variable themselves, depending on the type of models that are employed. In any event, this property enables the synchronization of the actual control system 50 and the simulation system 52 during normal operation of the process plant. In particular, at the kth time step, the total simulator state can be synchronized to the total control system state using the $U_{k-1}$, $X_k$ and $Y_k$ vectors as collected and communicated by the supervisor application 32. For the simulator total state update, the elements of $\theta_k$ are updated directly from the vector $X_k$ and the elements of the process state vector $\psi_k$ are calculated (determined) using $U_{k-1}$ and $Y_k$. Again the specific details of the calculations depend on the structure of the process model that is employed.

Thus, generally speaking, during operation, the simulation system 52 operates in parallel with but in a manner that is synchronized with the operation of the process control system 50. In particular, if the simulation system 52 was simply operated in parallel with the actual control system 50 but not synchronized therewith, the simulated process variables would eventually tend to drift from the actual process variables Y output from the process 56, due mainly to the effects of un-modeled dynamics and plant-model mismatch.

To overcome this problem, the remote simulation system 52 in the network cloud 48 remains synchronized with the actual control system 50 by periodically operating in a tracking mode in which the simulation system 52 receives the $U_{k-1}$, $Y_k$ and $X_k$ vectors from the actual control network 54 periodically, such as for each controller time step, from the supervisor application 32. The simulation system 52 then initializes the state of its simulated process control network 64 with the state information from the actual control network 54 as received from the supervisor 32. Moreover, in the tracking mode, an update module of the simulation system 52 recalculates the internal state variables ($\psi_k$) using the $U_{k-1}$ and $Y_k$ vectors to update the process model 66 so as to reflect the actual operation of the process during the last controller time-interval, thereby tracking or modeling the actual characteristics of the process 56 as measured or evident from the last controller scan time interval. Thus, while operating in the tracking mode, the simulation system 52 is continually initialized to the current plant conditions as communicated from the supervisor 32, including controller conditions and plant characteristics.

Figure 6:
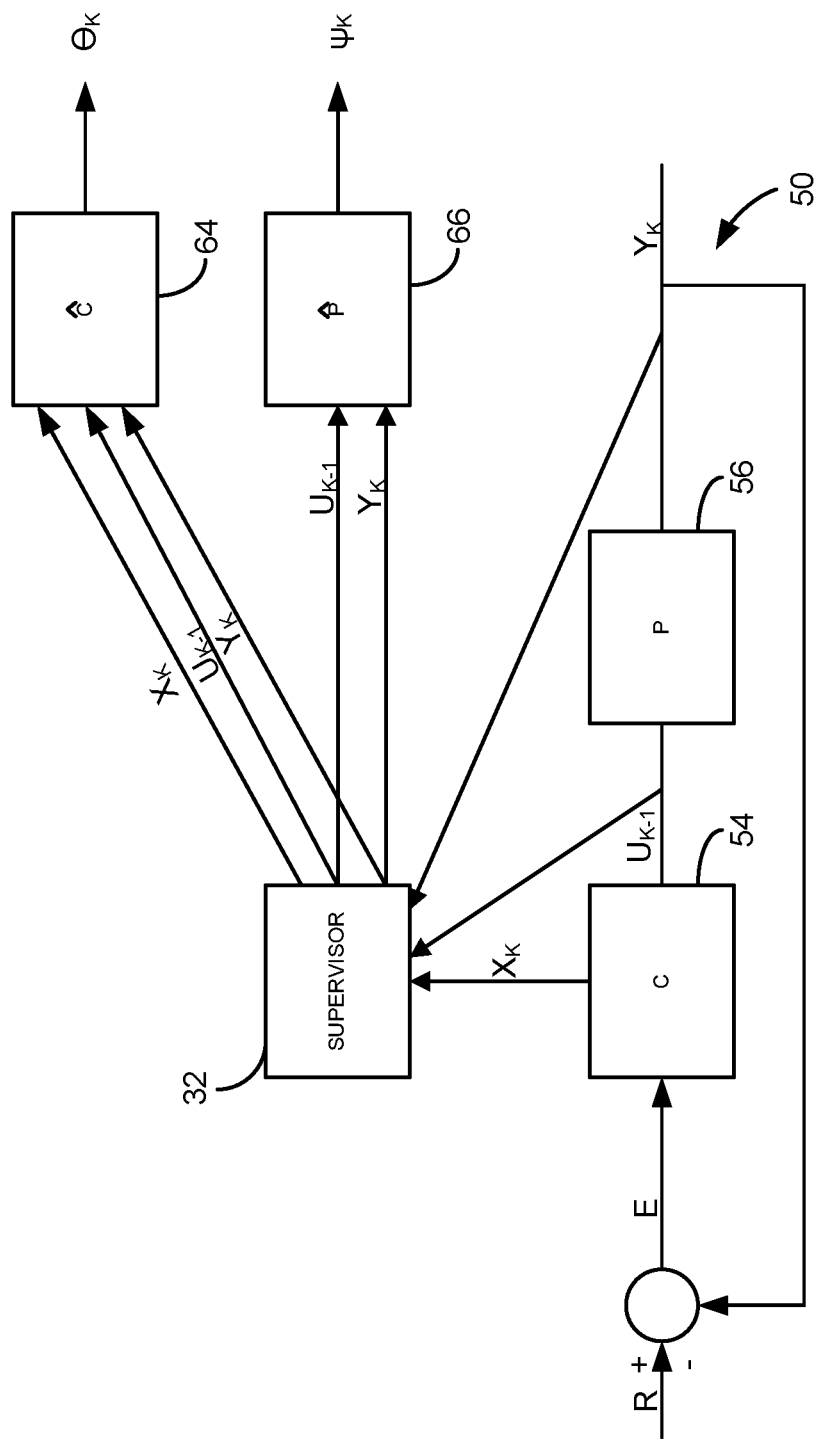
FIG. 6 is a logical block diagram illustrating the communicative interconnections between the simulation system and the control system of FIG. 2 during a tracking mode of operation.

FIG. 6 illustrates the operation of the simulation system 52, as shown in FIG. 5, for example, in the tracking mode in more detail. In particular, the process control system 50 is shown in FIG. 6 at the time instance k. However, in this case, the simulated process control network 64 of the simulation system 52 is configured to receive the internal state vector $X_k$ of the controller 54, the control signal vector $U_{k-1}$, and the process variable vector $Y_k$ from the supervisor 32 and updates the simulated controller 64 with these vectors. Likewise, the process model 66 receives the control signal vector $U_{k-1}$ and the process variable vector $Y_k$ from the supervisor 32 and determines the new process state vector $\psi_k$ from these values. In this manner, the process model 66 is updated periodically, such as after each scan of the process control system, to reflect the actual operation of the process plant.

As will be understood, therefore, during tracking mode, the simulation system 52 is constantly following or tracking the process operation by receiving supervisor data from the supervisor 32 and is updating its state parameters to reflect the current state, not only of the process control network 54, but of the characteristics of the process 56 itself by recalculating, or updating the state of the process model 66. As a result, the simulation system 52 remains synchronized with the operation of the process control system 50 and the process plant at all times during the tracking mode, making the simulation system 52 immediately available at any time to perform simulation with a high degree of fidelity.

To perform a particular predictive simulation, the remote simulation system 52 may be, at any time, placed in a prediction mode to perform actual simulation of the process control system 50 over some future time horizon. The actual simulation may take many forms or may simulate many different types of controller/process activities. However, in all cases, the simulation system 52 operates in parallel with the actual control system 50. In particular, during the prediction mode, the remote simulation system 52 stops updating the control network image 64 and the process model 66 with signals from the actual process plant received through the supervisor 32, but instead, operates to perform a prediction based on the most recent set of state variables {circumflex over (X)} developed during the tracking mode. In other words, during the prediction mode, the simulated process variables are calculated based on the process model 66 in closed loop fashion using the simulated process control network 64 and the set points R provided to the remote simulation system 52. In this case, the remote simulation system 52 is coupled to a user interface to enable a client to, if desired, change one or more parameters of the simulated control system or the simulated process to thereby simulate the response of the process to a control change or to a process dynamics change. Such a change may, for example, be a change to one or more of the set-points R, a change of a measured process variable, a change to the control routine itself, a change to a disturbance variable in the process, etc.

If desired, the remote simulation system 52, while in the prediction mode, may execute in one of three sub-modes, including a real-time sub-mode, a fast-time sub-mode and a slow-time sub-mode. In the real-time sub-mode, the simulation of the process variables proceeds in real time (i.e. at the same speed or scan rate as the actual control system 50). In a power plant control system application, this mode may be utilized by plant personnel to test proposed actions and inputs to the control system. In this scenario, the proposed action is applied to the (simulated) plant and the simulated response is observed to ensure that the action has the desired effects and/or that no abnormal conditions arise as a result of the action.

In the fast-time sub-mode, the simulated process variables are calculated at a rate faster than real time (i.e., than the controller scan rate). This mode may be utilized to quickly observe the predicted response of the processes variables over a future time horizon, to test the response of the plant to a new controller set-point, bias, other operator input or some other change in a control routine, etc. For example, at any given time, the predicted values and resulting trajectories of one or more process variables can be displayed for the next ten minutes or over some other prediction horizon, such as a horizon associated with the process returning to steady state operation.

In the slow-time sub-mode, the operator may view the operation of the simulated control slower than the actual process operating time or scan rate. This sub-mode may be used in for example, fast processes to provide the operator with more time to view and analyze the operation of the process in response to a contemplated change. Moreover, this sub-mode may be advantageously used when the simulation system 52 is used to perform training operations.

During operation, the integrated and synchronized remote simulation system will alternatively utilize both the tracking and prediction modes to perform simulation and prediction. In particular, during the time periods when the simulation system 52 is operating in tracking mode, the remote simulation system 52 is constantly being updated with the overall state information from the actual control system 50 through the supervisor application 32. This state data, as described above, may be communicated to the remote simulation system 52 by the control system 50 through the supervisor 32 on a periodic basis using the signal addresses stored as part of the configuration system.

In one mode, the remote simulation system 52 will receive a new set of state data from the process control system through the supervisor 32 during, or as a result of every scan of the controllers within the process control system 50. In other words, the state data within the process control system 50 may be collected in the supervisor 32 after each controller operation or scan and sent to the simulation system 52. The supervisor data may be addressed or sent individually to the simulation system 52 using appropriate communication procedures, or may be collected and sent as a bulk set of data to reduce communications overhead within the process control system. Of course, the remote simulation system 52 may instead receive the controller state information at a different rate, which may be a periodic rate, such as after every other scan, every fifth scan, etc. In this manner, while the remote simulation system 52 is in the tracking mode, the actual control system 50 and the remote simulation system 52 operate in synchronized fashion, which results from the fact that, at each time step associated with the periodic rate, the overall state of the remote simulation system 52 is updated from the supervisor 32 to identically match the actual control system 50.

However, at any instant, an operator or other client can put the remote simulation system 52 into the prediction mode. During operation in this mode, the sub-mode may be selected to be real-time mode to implement, for example, an evaluation of the effect of a set-point or tuning parameter change, to evaluate the effect of a control program change on the process, to evaluate a change in a process disturbance variable, etc. This feature provides the capability for the operator to perform "what-if" scenarios. In the case of evaluating a set-point change, the set-point change can be made on or provided to the remote simulation system 52 via a user interface that is identical or generally the same as the user interface system associated with the control system 50 which would allow or enable such a change. In this manner, the operation of the remote simulation system 52 will look and feel the same as if the operator were operating the actual control system 50, making the remote simulation system 52 easier to use and understand. Once the set-point change is made on the remote simulation system 52, the simulated process is then observed to ensure that the change has the desired or expected effect. This capability is targeted at eliminating human error in actual plant operation.

In the case of changing a control program, the program change may again be made using a configuration application that appears the same as or that appears similar to the configuration application used to make the programming change to the process control system 50 itself. Thus, again, the remote simulation system 52 may include a whole set of supporting applications, such as operator interface applications, configuration applications, trending applications, data processing or analysis applications, etc., that are provided for or are associated with the actual process control system 50. In any event, when the control routine change is made to the simulated controller network, the simulated process is monitored on the remote simulation system 52 to ensure that the desired effect is achieved and that no abnormal operational situations result. All human interaction with the remote simulation system 52, that is intended to mimic operations on the actual control system 50, may be performed with the remote simulation system 52 operating in real-time mode or in slow-time sub-mode, if for example, training is being performed using the remote simulation system 52.

If desired, however, the effect of a longer time horizon can be observed by placing the remote simulation system 52 in the fast-time sub-mode. Additionally, the operator may switch between different sub-modes during the simulation. For example, the operator may place the remote simulation system 52 in the fast-time sub-mode once the interaction (e.g. the set-point change or the control program change) has been made via the operator interface. In the fast-time sub-mode, the state of the simulation system evolves at a speed faster than the real-time scan or operational rate of the process control network 56. Of course, the fast-time and slow-time sub-modes may be implemented by changing the scan or operational period of the controllers and control programs within the simulated process control network 64. Moreover, if desired, the simulated process variables may be collected, stored and then reflected on associated historical trends at the end of the fast time execution, instead of or in addition to displaying these variables on the operator, engineer and maintenance personnel interfaces.

In some instances, the remote simulation system 52 may be operated such that a fast-time execution cycle will be executed automatically every 'N' time steps of the control system 50, where 'N' may be defined by the operator if so desired. In this situation, the remote simulation system 52 operates in tracking mode until the 'Nth' time step, at which time the remote simulation system 52 is automatically placed in the prediction mode for a single execution of a fast-time operation over a selected time horizon. At the end of the fast-time simulation, the simulator displays may be updated with the predicted process variables over the configured time horizon and/or with other information, such as any simulated alarms or alerts which were generated during the fast-time operation, etc. At the end of this fast-time operation, the remote simulation system 52 automatically returns to the tracking mode to update the process model 66 and the simulated control network 64 with new state variables from the supervisor 32 that is monitoring the actual process. This automatic operating condition may be used to update trend displays which show the predicted trajectories of the process variable(s) of interest, which is particularly helpful in, for example, the real-time integration of control functions and simulation during actual operation of a power plant and for implementing an automatic method that has the potential to eliminate process upsets and plant trips due to human error. The effect of operator action on plant emissions and thermodynamic/process efficiency can also be observed in this mode.

Moreover, if desired, some modules of the remote simulation system 52 may be distributed in different devices throughout the process plant. For example, the simulated process control network 64 may includes a simulation controller module (that is a copy of an actual control module) in each control device in which the actual control module 29 and 30 resides. In this case, the process model 66 may include a sub-model associated with a particular portion of the process plant (such as a particular process loop) disposed within the same process control device and communicatively connected to the appropriate simulation control model. Here, the simulation control module and the sub-model of the process operate together to perform simulation on a loop by loop basis within various different control devices. In this case, the simulation control modules may be in communication with operator interface routines such as the supervisor 32 which may be stored within the workstations 20 and 22 using standard communications to indicate or illustrate the operation of the simulation control modules during the prediction mode. The supervisor 32 may then communicate the data to the network cloud 48 for further operations. Likewise, the simulated control modules 64 and the process models 66 within the various devices within the plant may receive process state information directly from the associated control modules 29 and 30 of the actual process control network, or from an update module located within the same or a different device.

Of course, as will be understood, when used in a power generating plant, as well as other types of plants, the remote simulation system 52 as described herein may, among other things, (1) provide for the real-time integration of simulation and control functions during actual operation of a power plant, (2) provide a real-time prediction of emissions of a power generating plant over a finite future time horizon, (3) provide a mechanism for future generation market pricing, (4) enhance the effectiveness of the plant operations personnel by providing a real-time predictive function for each of the major process variables associated with the plant in response to the closed loop action of the control system, (5) provide a real-time indication of the onset of an abnormal situation, (6) allow the simulator initial conditions to be reset to a particular time period such that operating dynamics of the power plant can be "replayed" going forward in time from the time period that corresponds to the initial condition time step (which may be used to analyze past plant operation), (7) allow operations and/or engineering personal to evaluate the effect of a set-point, tuning parameter, configuration or programming change on the simulator before applying it to the actual plant, and (8) reduce plant trips due to operator action/inaction by providing a prediction of the major process variables for each time step extending over some finite future horizon.

Moreover, as will be understood, the remote simulation system 52 described herein includes the novel approach of distributing the simulation functions as an integral part of the overall control functions. In this approach, the simulation is utilized as an augmentation of the control functions to provide predictive functions associated with the process variables. The requirements and constraints associated with distributing the simulation are identical to the corresponding control functions.

FIG. 7 illustrates one manner of implementing the remote simulation system 52 described herein. In particular, the remote simulation system 52 of FIG. 7 includes the simulated process control network 64 communicatively coupled to the process model 66. However, as illustrated in FIG. 7, an update module 70 is communicatively coupled to the supervisor application 32 that receives data from the actual process control network 54, using any desired communication structure, to receive the process control network state variables, including the controller state variables X, as well as the appropriate process input and output state variables, such as the control signals U and the process variables Y.

If desired, the controller state variables X may be received at any periodic rate, which may be the same rate as or a different rate than the periodic rate at which the state variables U and Y are received from the process. Moreover, if desired, the controller state variables X may be received or updated at a periodic rate by being updated only when a change is actually made to one or more of these variables within the process control system 50 as determined by the change detector 82. In another embodiment, the controller state variables X may be streamed or communicated virtually instantly when they are received. In yet another embodiment, the controller state variables X may be collected until a threshold is passed and then the variables may be communicated. The threshold may be time or an amount of data or any other useful threshold.

The update module 70 may be located in the network cloud 48, which may be in the same or a different device than the simulated process control network 64 (or a portion thereof) and the process model 66 (or a portion thereof). The update module 70 may operate during the tracking mode to receive the state variables X, U and Y and to calculate the state vector .psi..sub.k and to provide the .theta. and .psi-..sub.k, vectors to the appropriate parts of the simulated control network 64 and the process model 66.

The remote simulation system 52 also includes a mode control module 72 that controls the operation of the remote simulation system 52 to be in one of two modes. In particular, in a first mode, the update module 70 periodically receives the first and second state variables and updates the simulated process control network 64 and the process model 66 using the developed state variables .theta. and .psi..sub.k. In a second mode, the simulated process control network 64 operates using the one or more simulated process variables to produce the one or more simulated control signals, and the process model 66 uses the one or more simulated control signals to produce the one or more simulated process variables (U^ or Y^). The mode control module 72 may operate the simulated process control network 64 in the second mode to execute at a real-time speed associated with the operational speed of the process control network 54, or at a speed that is either faster than or slower than the operational or real-time speed of the process control network 54. Moreover in one embodiment, the mode control module 72 may operate the simulated process control network 64 in the second mode to execute at a speed that is faster than the operational speed of the process control network 54 to produce a predicted process variable over a time horizon.

Still further, a user interface application 74 may be communicatively coupled to the update module 70, the mode control module 72, the simulated control network 64 and the process model 66 to perform user interface and display operations. In this case, the user interface application 74 may receive and display the simulated process variables and/or the simulated control signals to a client, and may enable a client to change parameters within the simulated process control network 64, such as one or more set-points, a controller routine, etc., or one or more parameters within the process model 66, to perform any desired simulation activity. Still further, the user interface application 74 may operate in conjunction with the mode control module 72 to periodically and automatically operate the remote simulation system 52 in the second mode to execute at a speed that is faster than the operational speed of the process control network 54 to produce a predicted process variable at a time horizon and to display the predicted process variable at the time horizon (and any other simulated variables or information) to a client. Of course, the user interface may perform other desired operations as well.

In some embodiments, the user interface application 74 may operate in the network cloud and the thin client on the workstation 20 22 at the plant 10 may display the user interface to the client. The user interface may be a web page that is communicated from the user interface application 74 in the network cloud to a web browser operating on a local computing device 20 22. In such an arrangement, the computationally intensive simulated control network 64 application may operate in the network cloud. Similarly, the user interface application 74 may operate in the network cloud and the user interface displayed at the client may be generated by a script or html based application that communicates back and forth with the network cloud. In other embodiments, the user interface application 74 may operate on the thin client at the plant and data may be communicated from the simulated control network 64 to the user interface application such as through the supervisor 32.

A storage module 80 may be provided as part of the simulation system 52 to store simulation data. The storage module 80 may be in communication with the update module 70, the actual process 54, the simulated control network 64 or remote simulation system 52 and process model 66. In FIG. 6, the storage module 80 is illustrated as being inside the update module 70 but it does not have to be. In other embodiments, the storage module 80 is physically separate from, but in communication with, the update module 70. In yet another embodiment, the storage module 80 may be in communication with the simulated control network 64 and the process model 66 which receive state data from the update module 70, all of which may be stored in the storage module 80.

The benefits of storing the simulation data are many and far reaching. By storing the simulation data, operations of the simulation system may be reviewed, replayed, analyzed and further studied. Further, as the storage module 80 may be in the network cloud, data for numerous simulation systems for numerous process plants may be stored and studied, creating a larger pool of data that may provide additional insight and may be more useful to clients. In addition, the storage may including much more additional data related the actual control network 52, the actual process 56 and the prediction of the process related data.

The simulation data may be the supervisor data and data generated by the simulation system 52 that is sufficient to allow the simulation to be replayed at a point in the future. For example, in some situations, the simulation algorithms may be known and only weights of specific variables and some process control network variables may need to be stored to allow the simulation to be executed again in the future. In other embodiments, the simulation algorithms may have been modified to better mimic the process and the modified algorithms may be stored as part of the simulation data as the algorithms may be needed to recreate the simulation at a point in the future. Some sample data may include application properties, configurations, user display data, input/output configuration data, etc.

The data may be stored in a variety of manners. In some embodiments, the data is stored in a database. The advantage of a database may be that the data may be easily queried. For example, a current situation may be similar to a past situation. The key variables may be queried and similar situations in the past may be reviewed to provide guidance regarding a path to take in the face of the current situation. The data may be stored in other formats. The data may be stored as a flat file, as an XML file, as comma separated values, as files that can be read by traditional word processors, spreadsheets or other databases.

One or more storage devices may be in communication with the remote simulation application in order to store simulation data such that it can be studied further in the future. Generally speaking, the storage devices may be any type of storage device currently known or created in the future such as rotating magnetic disks, optical drives, solid state storage devices or a combination of some or all of these storage devices. The storage devices may be configured in any manner or format such as a RAID format, or in a distributed manner such as using Hulabaloo, etc.

The simulation data may be useful in many ways. In one aspect, the simulation data may be used to provide guidance for present or future plant operations or simulations. As there will be a significant amount of data from a variety of plant processes and simulations, many situations that may occur or plan to occur may have already occurred in the past. The past situations to determine if a past situation may be sufficiently similar to the present or proposed situation to provide guidance on how the process may proceed or how the process may be maintained and properly simulated.

The simulation data also may be used for training purposes and training situations may be played in a sequence for new users. The training responses of a specific user may be stored, strengths and weaknesses of the user may be determined and training may be tailored to address weaknesses. Similarly, the training may be tailored to new equipment that has been added, new parts of the plant that have been added, etc. Trainees also may be trained to operate additional plants or additional aspects of the same plant. The training may be monitored by an authority and in some situations, certifications may be earned by successfully completing a training sequence.

The simulation data may also be subject to data analytics. Data analytics may review the simulation data and search for patterns or information that may be useful in reviewing process control or simulation applications. For example, if a small batch of valves has an unexpectedly high failure rate, on an individual simulation, the failure may not be noticed. However, by having additional data, the failure rate of the small batch of valves may be noticed.

The data analytics may also be used to improve the simulation application. For example, if the data from the simulation system 52 and the data from the process control system 50 are consistently off by a given amount or percentage, then it may be likely that the simulation algorithm should be adjusted to better mimic the actual process 56. In addition, as the network cloud may operate simulation applications for numerous plants, even more data will be available for review, leading to more reliable data and better simulations for all clients of the network cloud 48.

An advantage of the remote simulation system 52 being operated by another is the ease of adding another part of the plant process to the simulation. In the past, the simulation was operated on a local workstation and the additional part of the plant would have to be added at the local workstation. Adding the additional part of the plant is not as simple as selecting a check box. The elements of the additional part of the plant have to be individually added, connected and modeled which is a complicated task.

In the pending system, the task of setting up an additional part of the plant will be shifted to operators in the network cloud 48. As the operators of the network cloud 48 are extremely experienced at adding new elements and plant parts, meaning a minimal amount of information needs to be communicated to the operators of the network cloud 48. As an example, a drawing of the elements of the plant may be all that is necessary for the operators in the network cloud 48 to add the additional part of the plant. Of course, there may be a cost to have the operators in the network cloud 48. In some instances, the new element may be added automatically.

In addition, the additional plant part may be added on the fly or in real time. In the past, the simulation on the local workstation would have to be shutdown to add an additional plant part. Further, the additional plant part would have to be tested to ensure it was properly set up within the existing plant. According to the present system, the additional plant part may be set up separately, tested and seamlessly added to the present plant simulation.

Further, the network cloud based simulation system 52 makes other complex tasks significantly easier. As another example, in the past, it was very difficult to add technology from third party vendors. As explained earlier, the set up would have to occur at the local workstation where the simulation is operating. Further, a client or outside consultant would have to spend a significant amount of time either creating a way to virtualize the third party technology or mapping the third party technology to the technology already present in the simulation system 52. No matter how the task of virtualizing the third party software is approached, the likelihood of finding a client that has experience at the task of virtualizing third party software is very low. By having the simulation system 52 operate at a central cloud location, a team of technologist may be available that has significant experience at virtualizing third party software. In some situations, the third party software may have been virtualized previously, making the virtualization project much simpler and efficient.

Another advantage of the simulation system 52 being in a network cloud is that the infrastructure necessary for the cloud may already exist. Instead of a customer having to purchase a dedicated computing device or devices and related software, the computing devices and software may be supplied by another. The cloud may be public such as the Internet or may be a private network that is either owned by the simulation provider or by a third party. The client merely needs a computing device to operate the supervisor 32 which is a "light" application that is not as processor intensive as an on-site simulation application.

Another benefit of using the network cloud 48 for the simulation system 52 is efficiency. Even if the simulation was operated at a remote workstation, that workstation and related processors and memory will be dedicated to the simulation. The processor may have periods of great activity and then periods of little activity. By using a network cloud 48, numerous processes may use the same networked computing devices and the overall usage of the processors and memories likely will be higher. Further, there may be more processing power available when a sophisticated simulation needs to occur.

In general, a cloud based network of computing devices offers additional advantages. As the cloud is made up of a plurality of computing devices 49, if one computing device 49 fails, another computing device 49 can continue to execute the applications. Likewise, the cost of proper hvac, backup power, computing equipment space, trained operators, etc., can be spread over numerous users, making the cost to a user low. Cloud based networks can be accessed from virtually anywhere, making them more accessible (assuming the proper security limits access to those with the proper credentials). Cloud based networks offer more storage at a reduced cost than local storage as bulk storage of data is cheaper and if more storage is needed, an additional fee likely will have to be paid rather than buying and installing more equipment. Further, the data can be backed up or mirrored at the time of creation, making backups easier. Updating software is also easy as the updates are installed by experienced personnel in the background with little or no downtime to a user. Likewise, new modules may be added or installed to the cloud based computing system with little or no downtime to a user. Of course, these are just some of the obvious advantages as there may be more.

The operation of the remote simulation 52 may present new opportunities for processes, services and devices to be offered to clients. In the past, the simulation systems operated on local workstations and were tailored to the needs of the specific plant or process. By moving the simulation to a remote network 48, the local workstation may no longer be needed. A lightweight supervisor 32 application provides the relevant process and control data to the remote network 48 and the supervisor application 32 may be "light" enough to work on existing equipment 20 22. As a result, the remote simulation application 52 and apparatus may create new business opportunities.

As an example, the remote simulation 52 may be offered to clients on a subscription basis. The subscription price may be based on a variety of factors, such as the size of the plant, the amount of data from the plant, the amount of analysis. Further, the set up may have an initial cost that may be related to the complexity of the process being simulated. Other parts of the plant may be added at an additional cost. In addition, the network cloud may be offered to host additional applications related to the plant.

Additional services may be included as part of the subscription or may be available for an extra cost. Additional services may include running predictions of proposed changes to a process system, adding additional proposed parts of a plant 10 to a remote simulation system 52, providing specialized data analysis, providing more in depth data analysis, providing data analysis to proposed additions or changes to a process, comparing a process to other processes, reviewing the process for potential gains in efficiency, etc.

Figure 8:
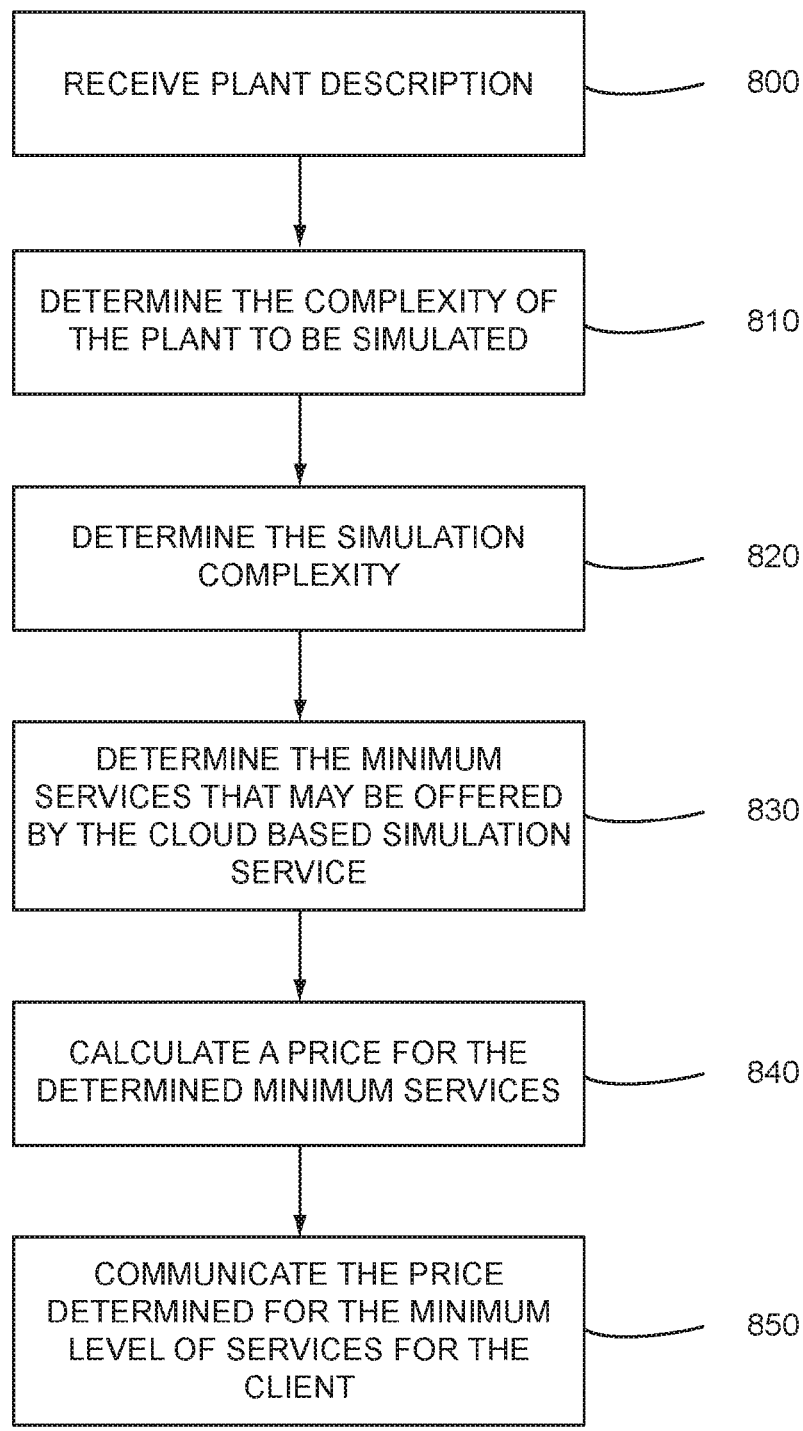
FIG. 8 is a block diagram of a method of selling network cloud based simulation services.

FIG. 8 may be a sample method of providing remote simulation services 52. At block 800, a plant description may be received. The plant description may be as simple as a printed diagram or may be numerous diagrams which illustrate flows in a plant, field devices, connections, physical locations, connection blocks, etc. One of the many benefits of having the simulation software 52 be at a centralized cloud based location 48 is that the software necessary to read and analyze plant diagrams may be used many times by the many clients of the cloud 48, thereby driving down the cost for the numerous clients of the cloud based simulation system 52. Of course, in some embodiments, the diagrams will be so crude or so dense that human intervention may be necessary to parse the diagrams into something that may be understood by the remote simulation system 52.

At block 810, the complexity of the plant to be simulated may be determined. The complexity and ability to simulate plants and processes varies among plants. In some plants, including large plants, the complexity may be low making the simulation easier. On the other hand, some plants, including small plants, may be extremely complex with multiple controllers and multiple interconnected processes. Such plants may be more complex to simulate.

In some embodiments, a formula may be used to give the plant complexity a score or value. The complexity score may be an attempt to determine an objective value for the plant complexity such that the plant complexity of one plant may be compared to another plant as a scaled plant complexity score. For example, if a plant has ten valves and one method, the complexity score may be 20, where each valve is worth 1 and each controller is worth 10. As yet another example, if the plant has five valves and 5 controllers, the score may be 55 (5×1=5 for the valves and 5×10 for the controllers). In other embodiments, an experienced reviewer at the central simulation cloud may simply review the plant illustrations and based on experience, determine a complexity level. The weights of each element may be varied based on the material, the age of the plant, the distance the material must travel, etc. Of course, other manners of calculating a complexity score are possible and are contemplated.

At block 820, the simulation complexity may be determined. The simulation complexity may be an indication of the complexity of the process or control routine used in the plant that may have to be added to this simulation. For example, if the control routine calls for numerous valves to open in a precise sequence based on field device measurements, then the simulation may be considered complex. Similarly, if a control routine or process operation is simple and has few actions, then the simulation may be considered to be less complex.

The simulation may be determined by reviewing the plant illustration from steps 800 and 810 which may contain process data or separate process data may be communicated which describes process. In yet another embodiment, the process may be determined using a combination of the plant illustration and process system related intelligence. For example, if a valve is described as being a valve that opens at 220 degrees Fahrenheit, process logic may indicate that part of the process heats a substance to 220 degrees Fahrenheit. On the other hand, the valve may be described as a relief valve that opens at 220 degrees Fahrenheit which may indicate that the process is designed to heat a substance to less than 220 degrees Fahrenheit. Similarly, a timing device may indicate that part of the process may operate for a period of time.

In some embodiments, the simulation may be given a simulation complexity score. The simulation complexity score may be an attempt to objectively compare the complexity of one simulation to another simulation using a scaled score. The complexity score may be based on the process operations that occur in the process. For example, if four measurements have to be taken and five valve operations have to occur, the simulation complexity score may be the number of measurements multiplied by a measurement weight and a number of valves multiplied by a valve weight. The weights may be varied depending on the material in question, the risk of the process, the value of the material, etc. Of course, other ways of calculating the simulation complexity score are possible and are contemplated.

At block 830, the minimum services that may be offered by the cloud based simulation service 52 may be determined. The minimum services may depend on a variety of factors and the minimum services may be negotiated. In some embodiments, the plant operators may indicate a minimum of services that will be required. The minimum may be the level of services that the client had previously when the simulation was operated on a workstation located on site or plant 10.

In other embodiments, the minimum level of services may be set by a supplier. For example, in order for the cloud based simulation service 52 to make economic sense, each client may be expected to use and pay for a minimum level of common services. Otherwise, the simulation operator will have little incentive to continue to operate and improve the simulation 52. In addition, the operator may know that for a simulation 52 to be effective, a minimum level of service may be required. For example, clients may not be in the best position to recognize the importance of some of the services or that some services are dependent on other services. As an example, simulations cannot be replayed unless the simulations are stored. Thus, sufficient storage modules may be required to allow simulations to be replayed.

In additional embodiments, the complexity of the plant and the complexity of the simulation may be reviewed to determine a minimum level of services that should be provided. For example, a complex plant and a complex simulation may have a higher level of suggested service while a less complex plant and a less complex simulation may have a lower level of suggested service. In some embodiments, the simulation complexity score and the plant complexity score may be used as part of a formula to determine the minimum level of services. For example, a high simulation complexity score and a high simulation complexity score may result in a higher suggested minimum level of service.

In addition, economics may come into play in determining a suggested level of service. For example, if a process is making an extremely valuable substance, more care may be given to providing a higher level of service to ensure that the extremely valuable substance is not ruined by a faulty process that could have been predicted through simulations 52. Similarly, if a plant process creates a dangerous substance, a higher level of service may be recommended such that dangerous situations may be avoided by executing even more simulations 52 than in other less dangerous situations.

In some embodiments, the proposed minimum services may be communicated to client. The client may have the option to approve the level of services, may adjust the level of services, may approve of the level of services, etc. In addition, a description may be given as to how the minimum level of services were determined and what other services may be available. In other embodiments, governmental safety rules may come into play and may make some services mandatory, and the mandatory services also may be communicated to a client.

At block 840, a price may be calculated for the determined minimum services. The price may be determined in a variety of ways. In some embodiments, the price may have a floor without regard to the minimum level of services. In this way, it may make economic sense for the operator to cover the set up costs and maintenance that comes with having the service online and operational. In some embodiments, the price may be related to the minimum services to be provided. As mentioned earlier, the minimum services may be different for each plant and each process. Thus, the minimum price may be different depending on the minimum services in question.

In some embodiments, the simulation complexity score and the plant complexity score may be used as part of a formula to determine the minimum level of services. For example, a high simulation complexity score and a high simulation complexity score may result in a higher suggested minimum level of service and a higher price. By using the scores, the price may be calculated automatically such as using an algorithm with the scores as inputs and price as an output. In another embodiment, each of the minimum services may have a price and the price of each minimum service may be totaled to arrive at a total price. In addition, depending on the size of the client and past history, a discount may be automatically offered.

Further, the pricing may be broken into levels or tiers. As an example and not limitation, there may be three tiers of pricing and the tiers may relate to the complexity of the plant and the complexity of the simulation. As mentioned previously, an algorithm or look-up table may be used to determine a suggested price. The algorithm may similarly be used to place a price into one of the tiers. In this way, simplified pricing may be offered to customers.

In some embodiments, the pricing may be based on past pricing to the customer or plant or to similar customers or similar plants. By analyzing past usage, the cost/benefit of a client/plant may be obtained. For example and not limitation, some clients/plants may use more than an expected amount of simulation services during a period of time or the simulations may be more taxing than expected. It may make sense to increase prices for these customers in the future. Similarly, some clients/plants may not use as much simulation time as expected or the simulations may be less computationally taxing than expects. In these situations, it may make sense to charge the clients/plants less in the future. The pricing may also be based on similar clients/plants. Past experience with clients/plants that have similar plants or similar simulations may provide guidance on appropriate pricing for a client/plants.

In virtually all situations, it is expected that utilizing the cloud 48 based services will be cheaper than having the simulation operate locally at a workstation. Numerous costs may be avoided by having the simulation operate in the cloud. For example, stand alone simulation systems often required a significant capital equipment investment including hardware, software, cost to model a plant, costs to model a process, etc. Further, all the equipment needs space. In addition, there are continuing costs such as maintaining the equipment and software, updating the equipment and software, supporting the equipment and software, etc. In addition, staff is needed to take care of all these issues. Estimates of the costs range from $500,000 for a small system to $2,000,000 for a bigger system.

The pricing may licensed for a fee in a variety of ways. For example, the license may be for specific modules and may be per plant or per unit or per user or a combination of these pricing elements. The price may include training on the system, the services themselves, maintenance of the simulator 32 and personnel to update and maintain the simulator 32. The licenses may be transferable in limited ways, such as within the same utility or the same subsidiary, depending on the situation and relationship. The licenses and expirations may be noted on the display screens and reminders may be given as the expiration approaches.

At block 850, the price determined for the minimum level services for client or plant may be communicated to the client. The communication may be in any appropriate manner sufficient to begin the process to form a binding agreement. For example, the client and the provider may traditionally communicate via email and thus, an email of the price and proposed services may be appropriate. In other situations, a formal letter with detailed attachments describing the fees and services may be appropriate. Of course, multiple forms of communication may be used and may be appropriate. At some point, care may be given to reducing the proposed service and fees to a legally binding agreement.

In some embodiments, optional services that may be of use to the client or plant may be determined by the provider. The minimum services may provide a useful start for simulation services, but additional services may assist a client or plant even more. Some clients or plants may not even know such additional services may exist. For example, some clients or plants may know that simulations of past events at the specific plant may be used for training services. However, an additional option may be available to compare the simulations from the present plant and process simulations to other plants and process simulations operated by others. Other plants and process simulations may provide new ideas and approaches that may be useful to the client. Further, local simulations may have been slower and had less options to model plants and simulations and the cloud based simulation system may have more processing capabilities to handle more complex plants and simulations which a client may not have contemplated.

The determination of whether (and which) optional services may be automated. The plant illustrations and process simulation may be automatically reviewed to determine if additional services would make sense. For example, older valves in the plant may be automatically recognized from the plant illustration and a recommendation may be to replace the older valves with newer, smart valves. A simulation may be offered to see what result the newer, smart valves would have on the plant efficiency, control and output. As another example, the present plant may be compared to previously reviewed plants and if efficiencies were found in the previous plant, the an efficiency study may be offered to the present plant.

Once additional services are identified, prices may be calculated for the optional services. Similar to the prices for the minimum level of services, the prices for additional services may be determined in a variety of ways. At a high level, the price of the additional tasks may relate to the complexity of the task in view of the plant and simulation in question. In some embodiments, the prices may be set according to the complexity of the additional task which may relate to the complexity of the plant, the complexity of the simulation and the complexity of the proposed task. Scoring may be used to assist in pricing the additional tasks. For example, the complexity of the plant to be analyzed may be multiplied by a factor related to the complexity of the proposed task and the resulting score may be used to determine a price. Similarly, the score may be used to place the proposed task into a level and the price may be based on the level.

The proposed price may be based on past experience or a projection of the amount of processor time, storage use, set up time, operator time required in the cloud, etc., that may be required. In some additional embodiments, the price may relate to the potential benefit to the client. For example, if an additional analysis module may save a client a significant amount of money by modifying a process or improving an output, the pricing may be based on a percentage of the savings that may occur.

Power Plant Example

As an example, a power generation plant may have a local workstation 20 22 based simulation system. The simulation system may require a workstation 20 22 which is significantly more complex than a traditional personal computer. The workstation 20 22 may also require a significant amount of storage capabilities to capture all the data from the plant 10 and to store the data that may be used to store and recreate a simulation at a point in the future. Further, there may be several operators that model the plant 10 and maintain the simulation system. The workstation, storage and related offices for the operators make take up office space and related expenses.

If the power generation plant decided to switch to a cloud based network simulation 52, several steps would have to occur. A plant description will need to be provided to the network cloud operator. In some embodiments, if a plant simulation already exists on a local workstation, then data representing the plant description may be electronically communicated. In other embodiments, print outs or illustrations of the plant may be communicated to the network cloud operator. In some embodiments, the illustrations may be scanned an in other examples, the illustrations may be hand delivered to the operator of the cloud services.

The plant description may be analyzed to determine a level of complexity of the plant. At a high level, the level of complexity may related to how difficult it may be to model and manipulated the plant description into an electronic form which will likely relate to the physical complexity of the plant itself. A more complex physical plant may cost more and a less complex physical plant may cost less. The analysis may occur in a variety of ways. In some embodiments, the analysis may be automated such as when electronic data is communicated that represents the plant description, such as from a stand-alone plant simulation.

In other embodiments, the plant design made be sent as (or converted from an illustration into) an electronic illustration and the electronic illustration may be analyzed to determine the various physical elements in the plant. As an example, a smart valve may have a standard illustration and the plant illustration may be analyzed to determine if any smart valves are in the plant illustration. Other plant elements may also have standard illustrations and the illustrations may be reviewed for these standard illustrations.

Further, intelligence may be used to interpret illustrations that may not be immediately recognized. For example, if a controller has an analog to digital convertor, it is likely that the input to the analog to digital convertor is an analog signal and the elements that produce analog signals may be searched to see if there is a match to the element on the plant drawing. Similar uses of intelligence and prediction to determine elements in the plant illustration are possible and are contemplated.

From the plant description, the complexity of the plant simulation may also be determined. Again, the plant simulation may be determined by receiving an electronic version of a pre-existing representation of the plant simulation, such as a plant simulation that operates on a local workstation. In another situation, the plant simulation may be determined from analyzing illustrations of the plant operation that is to be simulated. In some situations, a trained operator may be needed to review the proposed simulation and further hone the proposed simulation. The complexity of the simulation may be a representation of the difficulty of the process being simulated as some processes may be relatively simple (a gas powered power plant where a valve opens when a single field device register a temperature beyond a threshold of 212 degrees Fahrenheit when steam is formed) and other processes may be complex (a nuclear power plant with many valves, many temperatures, many pressure readings, highly dangerous products), etc. As mentioned previously, the simulation complexity may be represented by a calculated value.

Upon reviewing the plant complexity and the simulation complexity, a minimum simulation service level may be determined for the power plant 10. The service level may be based on the plant complexity and the simulation complexity of the power plant 10. For example, a small power plant that is seldom relied upon and has a standard and tested design may have a low simulation service level. In the alternative, a nuclear power plant that has a significant number of people that rely upon it and has a new and untested design may present great danger if the plant is shut down. Thus, the incentive to keep the nuclear power plant safely operating may be extremely high and the recommended level of service may also be high.

The price of the proposed simulation service may be determined. At a high level, the more complex the plant 10 and the simulation, the higher the price will be for the cloud based simulation. Other simulations may be used as a comparison to set the price or the price may be set based on a formula that takes into account the complexity of the physical plant and the complexity of the simulation. Of course, a combination of factors may be used to set the price and the price may be subject to negotiations. In the power plant example, a gas fueled plant will likely be less complex than a nuclear plant and thus the simulation of the gas fueled plant will likely be less than the simulation of the nuclear plant. Further, the cost of both simulations will be significantly less than the cost of a stand-alone simulation operated at the plant.

The proposed price may then be communicated to the power plant or power plant operator. The communication may take on a variety of forms but concern should be given to the fact that at some point, a contract for services based on the price and proposal should be created. If the contact with the power plant has been through email, an email may be sent or if the contact has been in person, a printed copy of the proposal may be delivered along with a personal presentation and demonstration of the services proposed to be delivered. Of course, other manners of delivering the price are possible and are contemplated.

In addition to the price and minimum level of services, the proposal may include proposed additional services and related costs. The plant 10 and simulation in question may be analyzed and a determination may be made whether additional services may make sense for the plant in question. The determination may be automated. For example and not limitation, the gas fired power plant may be determined to be similar to other gas fired power plants, and these previous gas fired plants may have been reviewed previously. Additional efficiencies may have been found by studying these plants such quicker responses to common problems that may eliminate the costly requirement of shutting down the entire plant to fix the problems. Logically, it would make sense to offer a study of the power plant operations to see if these additional efficiencies may work in the present plant. A cost for these additional services also may determined which may relate to the time required by cloud technicians to set up the study, the modeling of any changes to the plant or the simulation, etc. These pries and proposed services may also be communicated to the client in any logical manner.

It should be noted that when implemented, any of the simulation software described herein may be stored in any computer readable memory such as on a magnetic disk, a laser disk, or other storage medium, in a RAM or ROM of a computer or processor, etc. Likewise, this software may be delivered to a client, a process plant or an operator workstation using any known or desired delivery method including, for example, on a computer readable disk or other transportable computer storage mechanism or over a communication channel such as a telephone line, the Internet, the World Wide Web, any other local area network or wide area network, etc. (which delivery is viewed as being the same as or interchangeable with providing such software via a transportable storage medium). Furthermore, this software may be provided directly without modulation or encryption or may be modulated and/or encrypted using any suitable modulation carrier wave and/or encryption technique before being transmitted over a communication channel.

While the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention. Describing all the possible embodiments would be impossible, if not impractical.

The invention claimed is:

1. A network cloud based simulation system for simulating operation of a process control network as connected within a process plant, the simulation system comprising:
    a local supervisor module configured to collect from the process plant a first state variable indicative of a configuration of the process control network and a second state variable indicative of a process operation;
    a remote simulation module communicatively coupled to the local supervisor module via a network cloud system, the remote simulation module being configured to (i) use one or more simulated process variable signals to produce one or more simulated control signals to provide a simulated process control network that represents a simulation of the operation of the process control network as connected within the process plant, (ii) implement a process model that is communicatively coupled to the simulated process control network to produce the one or more simulated process variable signals using the one or more simulated control signals, (iii) periodically configure the simulated process control network with the first state variable, and (iv) periodically update the process model using the second state variable,
    wherein the local supervisor module is further configured to function as a single consolidated access point to bridge communications between the process control network and the network cloud system, and
    wherein the remote simulation module is further configured to store the first and second state variables as part of the network cloud system by communicating exclusively with the local supervisor module.

2. The system of claim 1, wherein the remote simulation module is further configured to store simulation data to facilitate the simulation of the operation of the process control network as connected within the process plant, the simulation data including data representative of the process model and the simulated process control network.

3. The system of claim 2, wherein the simulation data further includes a prediction of the first state variable and a prediction of the second state variable.

4. The system of claim 1, wherein the remote simulation module comprises:
a plurality of simulated process control networks.

5. The system of claim 1, wherein the remote simulation module comprises:
a plurality of process model versions.

6. The system of claim 1, wherein the one or more simulated control signals include the operation of the process control network and additional plant processes that are added while the network cloud based simulation system is operating.

7. A network cloud based simulation system for simulating operation of a process control network as connected within a process plant, the simulation system comprising:
a simulation system configured as part of a network cloud system, the simulation system providing a simulation of the operation of the process control network as connected within the process plant using a simulated process control network and a process model;
a supervisor module configured as part of the process plant that functions as a consolidated access point between the process control network and the network cloud system, the supervisor module being further configured to collect state variables from the process plant and to selectively transmit the collected state variables to the simulation system; and
an update module, configured as part of the network cloud system, the update module receiving the collected state variables exclusively from the supervisor module and storing the collected state variables as part of the network cloud system to update the simulation of the operation of the process control network.

8. The system of claim 7, wherein the state variables collected from the process plant include a first variable indicative of a configuration of the process control network and a second state variable indicative of a process operation.

9. The system of claim 8, wherein the update module is further configured to store simulation data to facilitate the simulation of the operation of the process control network as connected within the process plant, the simulation data including data representative of the process model and the simulated process control network.

10. The system of claim 9, wherein the simulation data further comprises:
a prediction of the first state variable and a prediction of the second state variable.

11. The system of claim 7, wherein the update module is further configured to store the collected state variables as part of the network cloud system to synchronize the simulation of the operation of the process control network to an actual operation of the process control network.

12. The system of claim 7, wherein the supervisor module is configured as a thin client application executed on a computing device.

13. The system of claim 7, wherein the supervisor module is further configured to transmit the collected state variables when a threshold amount of data has been collected.

14. The system of claim 7, wherein the supervisor module is further configured to transmit the collected state variables when a threshold amount of time has passed.

15. The system of claim 7, wherein the simulated process control network is further configured to generate one or more simulated control signals that are indicative of the operation of the process control network and additional plant processes that are added while the network cloud based simulation system is operating.

16. A method for simulating operation of a process control network as connected within a process plant, the method comprising:
generating, via a simulation system that is stored as part of a network cloud system, a simulated process control network that represents a simulation of the operation of the process control network as connected within the process plant;
collecting state variables from the process plant via a supervisor module that is part of the process plant and functions as a consolidated access point between the process control network and the network cloud system;
selectively transmitting, via the supervisor module, the collected state variables to the simulation system;
receiving, via an update module, the collected state variables exclusively from the supervisor module;
storing, via the update module, the collected state variables as part of the network cloud system; and
updating, via the simulation system, the simulation of the operation of the process control network based upon the stored collected state variables.

17. The method of claim 16, wherein the collected state variables include a first variable indicative of a configuration of the process control network and a second state variable indicative of a process operation.

18. The method of claim 17, further comprising:
storing, via the update module, simulation data in the network cloud system to facilitate the simulation of the operation of the process control network as connected within the process plant, the simulation data including data representative of the process model and the simulated process control network.

19. The method of claim 18, wherein the simulation data further comprises:
a prediction of the first state variable and a prediction of the second state variable.

20. The method of claim 16, wherein that act of updating the simulation of the operation of the process control network synchronizes the simulation of the operation of the process control network to an actual operation of the process control network.

21. The method of claim 16, wherein the act of selectively transmitting the collected state variables comprises:
transmitting the collected state variables when a threshold amount of data has been collected.

22. The method of claim 16, wherein the act of selectively transmitting the collected state variables comprises:
transmitting the collected state variables when a threshold amount of time has passed.

23. The method of claim 16, further comprising:
generating, by the simulation system, one or more simulated control signals that are indicative of the operation of the process control network and additional plant processes that are added while the network cloud based simulation system is operating.

* * * * *